(12) United States Patent
Grammel et al.

(10) Patent No.: US 12,355,803 B2
(45) Date of Patent: Jul. 8, 2025

(54) REMEDIATION WORK SCORE FOR NETWORK TRUST APPLICATIONS

(71) Applicant: Juniper Networks, Inc., Sunnyvale, CA (US)

(72) Inventors: Gert Grammel, Ditzingen (DE); Kieran Gerald McPeake, Belfast (GB)

(73) Assignee: Juniper Networks, Inc., Sunnyvale, CA (US)

(*) Notice: Subject to any disclaimer, the term of this patent is extended or adjusted under 35 U.S.C. 154(b) by 166 days.

(21) Appl. No.: 18/148,762

(22) Filed: Dec. 30, 2022

(65) Prior Publication Data
US 2024/0223589 A1 Jul. 4, 2024

(51) Int. Cl.
*G06F 21/00* (2013.01)
*H04L 9/40* (2022.01)

(52) U.S. Cl.
CPC ...... *H04L 63/1433* (2013.01); *H04L 63/1416* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 7,558,884 B2 | 7/2009 | Fuller et al. | |
| 7,788,700 B1 | 8/2010 | Feezel et al. | |
| 7,895,068 B2 | 2/2011 | LaSalle et al. | |
| 7,900,259 B2 * | 3/2011 | Jeschke | H04L 63/1433 726/30 |
| 8,205,257 B1 * | 6/2012 | Satish | G06F 21/577 726/25 |
| 8,549,622 B2 | 10/2013 | Byrne et al. | |
| 8,776,180 B2 * | 7/2014 | Kumar | G06F 21/564 713/157 |
| 9,363,283 B1 | 6/2016 | Herrera-Yagüe et al. | |
| 9,679,254 B1 | 6/2017 | Mawji et al. | |

(Continued)

FOREIGN PATENT DOCUMENTS

| | | |
|---|---|---|
| CN | 1716177 A | 1/2006 |
| CN | 101507229 A | 8/2009 |

(Continued)

OTHER PUBLICATIONS

Mandaglio et al., Generalized Preference Learning for Trust Network Inference, IEEE, Dec. 2, 2019, pp. 174583-174596. (Year: 2019).

(Continued)

*Primary Examiner* — Maung T Lwin
(74) *Attorney, Agent, or Firm* — Shumaker & Sieffert, P.A.

(57) ABSTRACT

This disclosure describes techniques that include determining a trust score for a network entity; identifying at least one weakness of the network entity, based on the determined trust score; determining a set of remediation actions for addressing the at least one weakness; determining, for each remediation action of the set of remediation actions, an expected amount of work associated with the remediation action; selecting a remediation action from the set of remediation actions, based on the determining, for each remediation action, the expected amount of work associated with the remediation action; and performing an operation associated with at least a portion of the selected remediation action.

20 Claims, 13 Drawing Sheets

501

| Network Entity | Description |
|---|---|
| Node A | High traffic throughput. |
| Node B | Low traffic throughput. |
| Relative ratio of friction vs. inertia for an entity | |
| Friction (% of Remediation Metric) | 60 |
| Inertia (% of Remediation Metric) | 40 |

(56) References Cited

U.S. PATENT DOCUMENTS

| | | |
|---|---|---|
| 9,769,174 B2* | 9/2017 | Rieke ............... H04L 41/22 |
| 9,860,275 B2 | 1/2018 | Kleinpeter et al. |
| 10,068,095 B1 | 9/2018 | Segal et al. |
| 10,237,293 B2 | 3/2019 | Hajmasan et al. |
| 10,432,605 B1 | 10/2019 | Lester et al. |
| 10,491,594 B2 | 11/2019 | Yan |
| 10,511,510 B2 | 12/2019 | Ricci |
| 10,855,619 B1 | 12/2020 | Andrews et al. |
| 10,855,725 B2 | 12/2020 | Pai et al. |
| 10,924,377 B2 | 2/2021 | Chauhan |
| 10,958,673 B1 | 3/2021 | Chen et al. |
| 11,321,464 B2* | 5/2022 | Govardhan ............ G06F 21/566 |
| 11,386,129 B2 | 7/2022 | Chrapko et al. |
| 11,503,061 B1 | 11/2022 | Lin et al. |
| 11,640,569 B2 | 5/2023 | Chrapko |
| 11,683,331 B2 | 6/2023 | Grammel et al. |
| 11,695,558 B2 | 7/2023 | Ray et al. |
| 12,074,879 B2 | 8/2024 | O'Neill et al. |
| 2005/0132229 A1 | 6/2005 | Zhang et al. |
| 2006/0248573 A1 | 11/2006 | Pannu et al. |
| 2007/0107059 A1 | 5/2007 | Chasin et al. |
| 2007/0147594 A1 | 6/2007 | Aaron et al. |
| 2009/0100504 A1 | 4/2009 | Conner et al. |
| 2009/0172776 A1 | 7/2009 | Makagon et al. |
| 2010/0220613 A1 | 9/2010 | Hendriks et al. |
| 2011/0072508 A1 | 3/2011 | Agarwal et al. |
| 2011/0280160 A1 | 11/2011 | Yang |
| 2013/0097317 A1 | 4/2013 | Sheleheda et al. |
| 2013/0138290 A1* | 5/2013 | Falkenstein ......... B60W 50/023 701/32.8 |
| 2013/0298192 A1 | 11/2013 | Kumar et al. |
| 2013/0298242 A1* | 11/2013 | Kumar ............... H04L 63/0209 726/25 |
| 2013/0298244 A1* | 11/2013 | Kumar ................ G06F 21/51 726/25 |
| 2014/0325586 A1 | 10/2014 | Halliday et al. |
| 2015/0074390 A1 | 3/2015 | Stoback et al. |
| 2015/0156208 A1 | 6/2015 | Kirkham et al. |
| 2015/0180903 A1 | 6/2015 | Cooper et al. |
| 2015/0304327 A1 | 10/2015 | Burstein et al. |
| 2015/0312267 A1 | 10/2015 | Thomas |
| 2016/0191540 A1 | 6/2016 | Fuka et al. |
| 2016/0261613 A1 | 9/2016 | Farmer et al. |
| 2016/0373486 A1 | 12/2016 | Kraemer |
| 2016/0381079 A1 | 12/2016 | Ben-Shalom et al. |
| 2017/0171231 A1 | 6/2017 | Reybok, Jr. et al. |
| 2018/0075563 A1 | 3/2018 | Ananthanpillai et al. |
| 2018/0091453 A1 | 3/2018 | Jakobsson |
| 2018/0183827 A1 | 6/2018 | Zorlular et al. |
| 2019/0182286 A1 | 6/2019 | Zini |
| 2019/0207954 A1 | 7/2019 | Ahuja et al. |
| 2019/0268366 A1 | 8/2019 | Zeng et al. |
| 2019/0342323 A1* | 11/2019 | Henderson ............ G06F 16/285 |
| 2020/0012796 A1 | 1/2020 | Trepagnier et al. |
| 2020/0067935 A1 | 2/2020 | Carnes et al. |
| 2020/0302540 A1 | 9/2020 | Xiu |
| 2020/0356676 A1 | 11/2020 | Gorlamandala |
| 2021/0029152 A1 | 1/2021 | Charles et al. |
| 2021/0075794 A1* | 3/2021 | Gazit ................ H04L 63/1408 |
| 2021/0273968 A1 | 9/2021 | Shaieb et al. |
| 2021/0409405 A1 | 12/2021 | Salajegheh et al. |
| 2022/0043913 A1 | 2/2022 | Keith, Jr. |
| 2022/0103592 A1 | 3/2022 | Semel et al. |
| 2022/0166788 A1 | 5/2022 | Grammel et al. |
| 2022/0201042 A1* | 6/2022 | Crabtree ............. G06F 16/2477 |
| 2022/0210142 A1 | 6/2022 | Sohail et al. |
| 2022/0329630 A1 | 10/2022 | Li |
| 2022/0345394 A1 | 10/2022 | Vasseur et al. |
| 2023/0083952 A1 | 3/2023 | O'Neill et al. |
| 2023/0128998 A1 | 4/2023 | Ping et al. |
| 2023/0185943 A1 | 6/2023 | Zhang et al. |
| 2023/0188527 A1 | 6/2023 | O'Neill et al. |
| 2023/0300150 A1 | 9/2023 | O'Neill et al. |
| 2024/0223589 A1 | 7/2024 | Grammel et al. |
| 2024/0364694 A1 | 10/2024 | O'Neill et al. |

FOREIGN PATENT DOCUMENTS

| | | |
|---|---|---|
| CN | 106575323 A | 4/2017 |
| CN | 108075925 A | 5/2018 |
| CN | 109196505 A | 1/2019 |
| CN | 109564669 A | 4/2019 |
| CN | 109891422 A | 6/2019 |
| CN | 109948911 A | 6/2019 |
| CN | 110313009 A | 10/2019 |
| EP | 1832059 A1 | 9/2007 |
| EP | 3343864 A1 | 7/2018 |
| EP | 4002795 A1 | 5/2022 |
| WO | 2006070172 A1 | 7/2006 |
| WO | 2006094275 A2 | 9/2006 |

OTHER PUBLICATIONS

Zhang et al., Mining Users Trust From E-commerce Reviews Based on Sentiment Similarity Analysis, IEEE, Jan. 31, 2019, pp. 13523-13535. (Year: 2019).

Communication pursuant to Rule 58 EPC from counterpart European Application No. 23169524.8 dated May 19, 2023, 3 pp.

U.S. Appl. No. 18/353,575, filed Jul. 17, 2023, by O'Neill et al.

Extended Search Report from counterpart European Application No. 23169524.8 dated Sep. 14, 2023, 10 pp.

"Cybersecurity of 5G networks EU Toolbox of risk mitigating measures," NIS Cooperation Group, CG Publication, Jan. 2020, 45 pp.

"Overview of Risks Introduced By 5G Adoption in the United States," Critical Infrastructure Security and Resilience Note, Cybersecurity and Infrastructure Security Agency, Jul. 31, 2019, 16 pp.

"Time Guidance for Network Operators, Chief Information Officers, and Chief Information Security Officers," Cybersecurity and Infrastructure Security Agency, Jun. 2020, 18 pp.

CIS Benchmarks, "CIS Cisco IOS 15 Benchmark", National Institute of Standards and Technology, vol. 4, No. 1, Apr. 11, 2022, 214 pp., URL: https://ncp.nist.gov/checklist/599.

Conran, "Zero Trust Networking (ZTN): don't trust anything," The Network Architect, Sep. 18, 2018, 7 pp.

Omeyer, "7 Top Metrics for Measuring Your Technical Debt", Jan. 13, 2022, 6 pp., URL: https://dev.to/alexomeyer/8-top-metrics-for-measuring-your-technical-debt-5bnm.

U.S. Appl. No. 17/644,555, filed Dec. 15, 2021, naming inventors O'Neill et al.

U.S. Appl. No. 17/655,140, filed Mar. 16, 2022, naming inventors O'Neill et al.

Response to Extended Search Report dated Sep. 14, 2023, from counterpart European Application No. 23169524.8 filed Jan. 3, 2025, 31 pp.

Lu et al., "Trust Evaluation in Networked Manufacturing Environment," Journal of WUT, vol. 35 No. 2, Apr. 2013, 4 pp.

Jian et al., "Dynamic Evaluation Method of Network Trust based on Congnitive Behavior," Communications Technology, vol. 49, No. 9, Sep. 2016, 6 pp.

* cited by examiner

```
{
  "id": "e5140eed-4392-4aac-9334-cd8cbabee829",
  "description": "2-port 100GbE + 8-port 10GbE line card; optics sold separately",
  "memory": 128,
  "product": "EX9200",
  "note": "Product Transition to a different line card",
  "published": true,
  "eolMatrixId": 15899,
  "modelId": "EX9200-2C-8XS",
  "topLevelAssyNum": null,
  "circuitAssyNum": null,
  "osPlatformId": 1,
  "psnNumber": "TSB18111",
  "isMemoryUsed": 0,
  "announcedDate": "2021-10-15T01:00:00.000Z",
  "endSaleDate": "2022-03-31T01:00:00.000Z",
  "endEngineeringDate": "2025-01-02T00:00:00.000Z",
  "endEngineeringDateHw": "2025-01-02T00:00:00.000Z",
  "endServiceDate": "2027-03-31T01:00:00.000Z",
  "replacementModel": "EX9200-12QS",
  "descReplacementModel": null,
  "createdBy": "kundong",
  "modifiedBy": "kundong",
  "endWarrantySvcCnvrsnDate": null,
  "firstServiceStepDownDate": null,
  "secondServiceStepDownDate": null,
  "endServiceContractRnwlDate": null,
  "announcementType": "End Of Life",
  "lastSoftwareVersion": "22.2R1",
  "minimumSoftwareVersion": null,
  "rohsCompliance": "Yes",
  "rmaDiscontinuedDateOtherCountries": "2027-03-31T01:00:00.000Z",
  "rmaDiscontinuedDateUsAndEu": "2027-03-31T01:00:00.000Z",
  "rmaDiscontinuedDateNewBuyCountries": "2027-03-31T01:00:00.000Z",
  "secondServiceStepDownDateUsAndEu": null,
  "secondServiceStepDownDateNewBuyCountries": null,
  "snowflakeId": "5d4d6036-36db-4896-94b9-29d184a4278e",
  "createdAt": "2021-10-15T00:00:00.000Z",
  "updatedAt": "2021-10-15T00:00:00.000Z"
},
```

FIG. 3

Trust ˅ / Integrity ˅ / Hardware EOL ˅
Hardware End of Life ⓘ

1 selected | More ˅ | ⌄ ⌕

Total Targets > 0 × | + | × | Save

| SKU | Targets | Description | Announced | Last Order | End of Support | Replacements |
|---|---|---|---|---|---|---|
| ⊙ RE-DUO-C2600-16G-S | ptx3000 | Routing engine with dual core 2600... | Sep 30, 2020 | Mar 31, 2021 | ⚠ Mar 31, 2023 | RE-PTX-X8-64G-S +3 |
| ○ SCB-MX960-S  401 | mx35 ˄ | Switch Control Board, MX960, Spare | Jun 17, 2015 | May 1, 2016 | ⊘ May 1, 2021 | SCBE-MX-S ˄<br>SCBE2-MX-S |
| ○ SCBE-MX-S | mx34 | Enhanced MX Switch Control Board | Jun 30, 2020 | Jun 30, 2021 | ⊘ Jun 30, 2026 | SCBE2-MX-S |
| ⊙ RE-S-1800X4-32G-S | mx34 +1 | Routing Engine - Quad Core 1800Gh... | Jun 30, 2020 | Jun 30, 2021 | ⊘ Jun 30, 2026 | RE-S-X6-64G-S |
| ○ PSM-SFF-PTX-AC-S | ptx3000 | PTX Small Form Factor AC Power Su... | Mar 24, 2021 | Mar 31, 2022 | ⊘ Mar 31, 2027 | JNP10K-PWR-AC2 |
| ○ SIB3-SFF-PTX-S | ptx3000 | 3rd Generation Small Form Factor S... | Mar 24, 2021 | Mar 31, 2022 | ⊘ Mar 31, 2027 | JNP10008-SF3 |
| ○ FPD-SFF-PTX-S | ptx3000 | PTX Small Form Factor CRAFT panel... | Mar 24, 2021 | Mar 31, 2022 | ⊘ Mar 31, 2027 | JNP10008-FRPNL1-BB |
| ○ FAN-SFF-PTX-S | ptx3000 | PTX Small Form Factor Fan Tray, spa... | Mar 24, 2021 | Mar 31, 2022 | ⊘ Mar 31, 2027 | JNP10008-FAN2-S |
| ○ FFANTRAY-MX240-S | mx35 | MX240 Fantray, Spare | Feb 10, 2013 | Feb 27, 2014 | ⓘ Feb 27, 2019 | FFANTRAY-MX240-HC-S |
| ○ EX4200-48P | ex10 +1 | EX 4200, 48-port 10/100/1000BaseT ... | Jan 1, 2013 | Jun 30, 2013 | ⊘ Jun 30, 2018 | EX4200-48PX |
| ○ EX-PWR-930-AC | ex10 +1 | EX 4200 and EX 3200 930W AC Powe... | Jan 1, 2013 | Jun 30, 2013 | ⊘ Jun 30, 2018 | EX-PWR3-930-AC |
| ○ CHAS-MP-PTX3000-S | ptx3000 | PTX3000 Chassis with Mid-Plane, sp... | Mar 24, 2021 | Mar 31, 2022 | ⊘ Mar 31, 2027 | .. |
| ⊙▦ DPCE-R-4XGE-XFP | mx34 +1 | Enhanced 4x10GE DPC with latest L... | Oct 31, 2015 | May 1, 2016 | ⊘ May 1, 2021 | .. |
| ○ CB-SFF-PTX-S | ptx3000 | PTX Small Form Factor Control Boar... | Mar 24, 2021 | Mar 31, 2022 | ⊘ Mar 31, 2027 | .. |
| ○ FPC3-SFF-PTX-U1 | ptx3000 | PTX3000 3rd Generation Small Form... | Mar 24, 2021 | Mar 31, 2022 | ⊘ Mar 31, 2027 | .. |

15 items ⟳ | Display 15 < 1 >

```
regress@ex11> show system users
fpc0:
─────────────────────────────────────────────
3:22AM up 142 days, 1:28, 1 user, load averages: 0.03, 0.06, 0.06
USER  TTY FROM              LOGIN@  IDLE WHAT
regress p0  10.107.66.241   2:54AM  - -cli (cli)
```

```
regress@access-pe4> show firewall
Filter: __default_bpdu_filter__
Filter: Foo
Policers:
Name       Bytes      Packets
Foo-100
Filter: Bar
Policers:
Name       Bytes      Packets
Bar-100
// SNIP
```

```
user@host> show interfaces statistics ge-0/1/7
Physical interface: ge-0/1/7, Enabled, Physical link is Down
Interface index: 151, SNMP ifIndex: 524
Link-level type: Ethernet, Media type: Copper, MTU: 1514, Link-mode: Full-duplex, Speed: 1000mbps, BPDU Error: None, MAC-REWRITE Error: None,
Loopback: Disabled,
Source filtering: Disabled, Flow control: Enabled, Auto-negotiation: Enabled, Remote fault: Online
Device flags : Present Running Down
Interface flags: Hardware-Down SNMP-Traps Internal: 0x0
Link flags : None
CoS queues : 8 supported, 8 maximum usable queues
Current address: 00:00:5E:00:53:a3, Hardware address: 00:00:5E:00:53:a3
Last flapped : 2012-05-11 04:25:28 PDT (2d 20:23 ago)
Statistics last cleared: 2012-05-13 23:07:23 PDT (01:41:25 ago)
Input rate : 0 bps (0 pps)
Output rate : 0 bps (0 pps)
Input errors: 0, Output errors: 0
Active alarms : LINK
Active defects : LINK
Interface transmit statistics: Disabled
```

```
regress@ex11> show interfaces terse
Interface Admin Link Proto Local Remote
ge-0/0/0 up down
ge-0/0/0.0 up down eth-switch
ge-0/0/1 up up
ge-0/0/1.0 up up eth-switch
// SNIP
jsrv.1 up up inet 128.0.0.127/2
lo0 up up
lo0.16384 up up inet 127.0.0.1 --> 0/0
lsi up up
me0 up up
me0.0 up up inet 172.26.138.11/24
mtun up up
pimd up up
pime up up
tap up up
vlan up up
vme up down
 {master:0}
```

FIG. 5D

```
regress@ex11> show system license usage
Licenses Licenses Licenses Expiry
Feature name used installed needed
bgp 1 0 1 invalid
isis 1 0 1 invalid
{master:0}
```

FIG. 5E

```
regress@ex11> show chassis hardware models
Hardware inventory:
Item Version Part number Serial number FRU model number
Routing Engine 0 REV 24 750-021255 BQ0210090233 EX4200-48P
FPC 0 REV 24 750-021255 BQ0210090233 EX4200-48P
 PIC 0                BUILTIN    BUILTIN       EX4200-48P
Power Supply 0 REV 03 740-020959 AV0810040376 EX-PWR-930-AC
Power Supply 1 REV 03 740-020959 AV0810120372 EX-PWR-930-AC
{master:0}
```

FIG. 5F

```
regress@ex11> show configuration
Last commit: 2010-11-02 04:47:24 UTC by regress
version 15.1R5.5;
system {
 host-name ex11;
 domain-name jnpr.belfast;
 // etc.
```

FIG. 5G

| Network Entity | Description |
|---|---|
| Node A | High traffic throughput. |
| Node B | Low traffic throughput. |
| Relative ratio of friction vs. inertia for an entity | |
| Friction (% of Remediation Metric) | 60 |
| Inertia (% of Remediation Metric) | 40 |

| Sample Remediation Metric Calculation | | | Node A (P-Router) | | | Node B (PE-router) | | |
|---|---|---|---|---|---|---|---|---|
| | Factor Description | Relative factor-weight where total should be 100 | Value | Score (max 100) | Weighted Contribution | Value | Score (max 100) | Weighted Contribution (weight * score) |
| Contributions within Friction | Complexity of procedure | 20 | Average | 50 | 10 | Average | 50 | 10 |
| | Parameter count | 30 | 2 | 10 | 3 | 6 | 90 | 27 |
| | Replacement Options | 50 | 1 | 10 | 5 | 1 | 10 | 5 |
| | Maximum Friction | 100 | | | 18 | | | 42 |
| Contributions within Inertia | Number of management user accounts on the device | 10 | 1-4 | 0 | 0 | 1-4 | 0 | 0 |
| | Number of active user sessions and tunnel end-points. Calculation based on a sigmoid function. See graph on right, where scale is 1.0 on graph represents 1000 endpoints. | 10 | 10 | 0 | 0 | 400 | 27 | 2.7 |
| | Overall volume of traffic in a given timeframe (GB/sec) | 10 | 1100 | 100 | 10 | 600 | 72 | 7.2 |
| | Characteristics of physical and logical interfaces, e.g., number, type, capacity. See graph on right, where scale is 1.0 on graph represents 100 characteristics. | 10 | 10 | 1 | 0.1 | 64 | 80 | 8 |
| | Number of enabled features on the device | 10 | 3 | 1 | 0.1 | 50 | 100 | 10 |
| | Number of inventory-type details per node | 20 | 10 | 30 | 6 | 25 | 100 | 20 |
| | Size of configuration e.g. file-size or line count | 30 | 800 | 1 | 0.3 | 5000 | 50 | 15 |
| | Maximum Inertia | 100 | | | 16.5 | | | 62.9 |
| Remediation Metric | | 100 | | | 17.4 | | | 50.36 |

FIG. 7

| | Factor Description Each is 0 -> 100% | Per Factor Weight where total should be 100 | Example Value | Example Metric (%) | Example Weighted Contribution |
|---|---|---|---|---|---|
| Contributions within Friction | Complexity of procedure | | Complex | 100 | 20 |
| | | | Average | 50 | 10 |
| | | 20 | Simple | 0 | 0 |
| 902 | Parameter count Refer Sigmoid function (Blue coloured curve) 802 (FIG. 8) | | Either no configuration needed (e.g. pure hardware change) or simple config. with zero params. | 0 | 0 |
| | | | 2 | 10 | 3 |
| | | 30 | 6 | 90 | 27 |
| 901 | Replacement Options Refer Sigmoid function (Indigo coloured curve) 801 (FIG. 8) | | No replacement needed | 0 | 0 |
| | | | 1 | 10 | 5 |
| | | | 8 | 100 | 50 |
| | | 50 | No replacement defined | 100 | 50 |
| | Maximum Friction | 100 | | | |
| Contributions within Inertia | Number of management user accounts on the device | 10 | 1-4 | 0 | 0 |
| | | | >=5 | 100 | 10 |
| | Number of active user sessions and tunnel end-points. Calculation based on a sigmoid function. See graph on right, where scale is 1.0 on graph represents 1000 endpoints. | | 1000 | 100 | 10 |
| | | | 400 | 27 | 2.7 |
| | | 10 | 10 | 0 | 0 |
| | Overall volume of traffic in a given timeframe (GB/sec) | | 1100 | 100 | 10 |
| | | | 600 | 72 | 7.2 |
| | | 10 | 10 | 0 | 0 |
| | Characteristics of physical and logical interfaces, e.g., number, type, capacity. See graph on right, where scale is 1.0 on graph represents 100 characteristics. | | 64 | 80 | 8 |
| | | | 32 | 30 | 3 |
| | | 10 | 10 | 1 | 0.1 |
| | Number of enabled features on the device | | 50 | 100 | 10 |
| | | | 10 | 5 | 0.5 |
| | | 10 | 3 | 1 | 0.1 |
| | Number of inventory-type details per node | | 25 | 100 | 20 |
| | | | 10 | 30 | 6 |
| | | 20 | 5 | 5 | 1 |
| | Size of configuration e.g. file-size or line count | | 10000 | 100 | 30 |
| | | | 5000 | 50 | 15 |
| | | 30 | 800 | 1 | 0.3 |
| | Maximum Inertia | 100 | | | |

FIG. 9

| Friction share | 60 |
| Inertia share | 40 |

| Change | Action | Trust Opportunity for action | Friction % | Inertia % | Remediation Metric per change % | Trust per (Remediation Metric per change) % |
|---|---|---|---|---|---|---|
| 1 | Replace SKU-44 on Node 2 | 6 | 70 | 90 | 78 | 7.7 |
| 2 | Fix SNMP Config on Node 3 | 5 | 50 | 50 | 50 | 10.0 |
| 3 | Replace SKU-44 on Node 3 | 8 | 70 | 50 | 62 | 12.9 |
| 4 | Fix SNMP Config on Node 1 | 4 | 50 | 30 | 42 | 9.5 |
| | sum | | | | 232 | |

FIG. 10A

| Node | Action | Trust Opportunity for action | Friction % | Inertia % | Remediation Metric per change % | Trust per (Remediation Metric per change) % |
|---|---|---|---|---|---|---|
| Node-2 | Replace SKU-44 on Node 2 | 6 | 70 | 90 | 78 | 7.7 |
| Node-3 | Fix SNMP Config on Node 3 | 5 | 50 | 50 | 62 | 14.1 |
| | Replace SKU-44 on Node 3 | 8 | 70 | 50 | | |
| Node-1 | Fix SNMP Config on Node 1 | 4 | 50 | 30 | 42 | 9.5 |
| | sum | | | | 212 | |

FIG. 10B

| Change | Action | Trust Opportunity for action | Friction % | Inertia % | Remediation Metric per change % | Trust per (Remediation Metric per change) % |
|---|---|---|---|---|---|---|
| Replace SKU-44 | Replace SKU-44 on Node 2 | 6 | 70 | 90 | 98 | 14.3 |
| | Replace SKU-44 on Node 3 | 8 | 70 | 50 | | |
| Fix SNMP Config | Fix SNMP Config on Node 3 | 5 | 50 | 50 | 62 | 14.5 |
| | Fix SNMP Config on Node 1 | 4 | 50 | 30 | | |
| | sum | | | | 160.0 | |

FIG. 10C

REMEDIATION WORK SCORE FOR NETWORK TRUST APPLICATIONS

TECHNICAL FIELD

The disclosure relates to computer networks and to trust levels attributed to entities in a network.

BACKGROUND

A trust score can be used to assess the trustworthiness of a network entity. Some illustrative types of network entities may include network nodes (e.g., endpoint devices, intermediate network devices, etc.), network services, or other types of real or virtual entities that can be identified on a computer network. The trust score may consider one or more current characteristics of the network entity, as well as one or more specified historical events. In response to the trust score identifying a weakness, one or more candidate remediation actions for the weakness can be determined.

SUMMARY

This disclosure describes techniques that include determining an amount of work needed to apply a remediation action to a network entity. The remediation action may improve a trust score of the network entity. The network entity may comprise a node or a service. A computing system may calculate the trust score for the network entity. The trust score may provide an assessment of a trustworthiness of the network entity based on a set of characteristics for the network entity and one or more historical events. The computing system may use the trust score to identify at least one weakness of the network entity, and to determine a set of candidate remediation actions to address the at least one weakness. For instance, the set of candidate remediation actions may include modifying one or more traffic patterns in the network, limiting access to one or more devices in the network, enabling access to one or more devices in the network, or any of various combinations thereof. The computing system may determine, for each remediation action in the set of candidate remediation actions, an expected amount of work associated with the remediation action. The computing system may select a remediation action from the set of candidate remediation actions, based on the expected amount of work associated with each of the remediation actions. The computing system may perform an operation to execute at least a portion of the selected remediation action.

In some examples, a remediation metric is determined based on the expected amount of work associated with each remediation action in the set of candidate remediation actions. For example, the expected amount of work can differ among different environments or contexts, and calculating different amounts of work in a flexible or configurable manner may be provided. The remediation metric can be quantified using a friction metric related to the remediation action itself, and an inertia metric related to the network entity representing a target for the remediation work. The friction metric may include any of a configuration change, or one or more equipment replacement options. The inertia metric may include any of an internal diversity of the target, or one or more external dependencies on the target.

Examples herein are often described in terms of entities that take the form of network devices, computing devices, and/or computing services (e.g., "network entities"). However, techniques described herein may apply to other types of entities. Such entities may be, for example, quantitative or qualitative entities.

In some examples, this disclosure describes operations performed by a network controller in accordance with one or more aspects of this disclosure. In one specific example, this disclosure describes a method comprising determining, by a computing system, a trust score for a network entity; identifying, by the computing system, at least one weakness of the network entity, based on the determined trust score; determining, by the computing system, a set of remediation actions for addressing the at least one weakness; determining, by the computing system, for each remediation action of the set of remediation actions, an expected amount of work associated with the remediation action; selecting, by the computing system, a remediation action from the set of remediation actions, based on the determining, for each remediation action, the expected amount of work associated with the remediation action; and performing, by the computing system, an operation associated with at least a portion of the selected remediation action.

In another example, this disclosure describes a system comprising processing circuitry and a storage device, wherein the processing circuitry has access to the storage device and is configured to determine a trust score for a network entity; identify at least one weakness of the network entity, based on the determined trust score; determine a set of remediation actions for addressing the at least one weakness; determine, for each remediation action of the set of remediation actions, an expected amount of work associated with the remediation action; select a remediation action from the set of remediation actions, based on the determining, for each remediation action, the expected amount of work associated with the remediation action; and perform an operation associated with at least a portion of the selected remediation action.

In another example, this disclosure describes a computer-readable storage medium comprising instructions that, when executed, configure processing circuitry of a computing system to determine a trust score for a network entity, identify at least one weakness of the network entity, based on the determined trust score; determine a set of remediation actions for addressing the at least one weakness; determine, for each remediation action of the set of remediation actions, an expected amount of work associated with the remediation action; select a remediation action from the set of remediation actions, based on the determining, for each remediation action, the expected amount of work associated with the remediation action; and perform an operation associated with at least a portion of the selected remediation action.

BRIEF DESCRIPTION OF THE DRAWINGS

FIG. 3 illustrates an example of hardware data for determining a friction metric of a network entity, in accordance with one or more aspects of this disclosure.

FIG. 4 illustrates an example of hardware data for determining friction metrics for a plurality of network entities, in accordance with one or more aspects of the present disclosure.

FIGS. 5A-5G illustrate examples of determining an inertia metric, in accordance with one or more aspects of the present disclosure.

FIG. 6 illustrates an example of determining a remediation metric by applying a relative weighting to the inertia metric and the friction metric, in accordance with one or more aspects of the present disclosure.

FIG. 7 illustrates an example of a scoring table for determining the inertia metric and the friction metric, in accordance with one or more aspects of the present disclosure.

FIG. 9 illustrates an example of weighing contributions within friction and contributions within inertia to prepare the scoring table of FIG. 7, in accordance with one or more aspects of the present disclosure.

FIGS. 10A-10C illustrate examples of determining the remediation metric, in accordance with one or more aspects of the present disclosure.

DETAILED DESCRIPTION

As previously described, in response to the trust score identifying a weakness, one or more candidate remediation actions for the weakness can be determined. An amount of work needed to apply each of a plurality of candidate remediation actions can be determined, such that a best, optimum, or desired remediation action can be selected from among the plurality of candidate remediation actions. The amount of work is distinct from the trust score. The trust score indicates a potential gain in trust after applying the remediation action, thereby providing a measure of improvement. However, the trust score does not indicate or assess the amount of work needed to apply the remediation action. The amount of work may encompass multiple factors related to making changes in the network, such as effort, difficulty, cost, complexity, confidence of success, risk of failure, and impact of failure. Conventional approaches to assessing the amount of work may use a non-automated subjective assessment process which requires experienced users and/or experts to study the network. This process is quite time-consuming, often placing heavy demands on the experts.

Figure 1A:
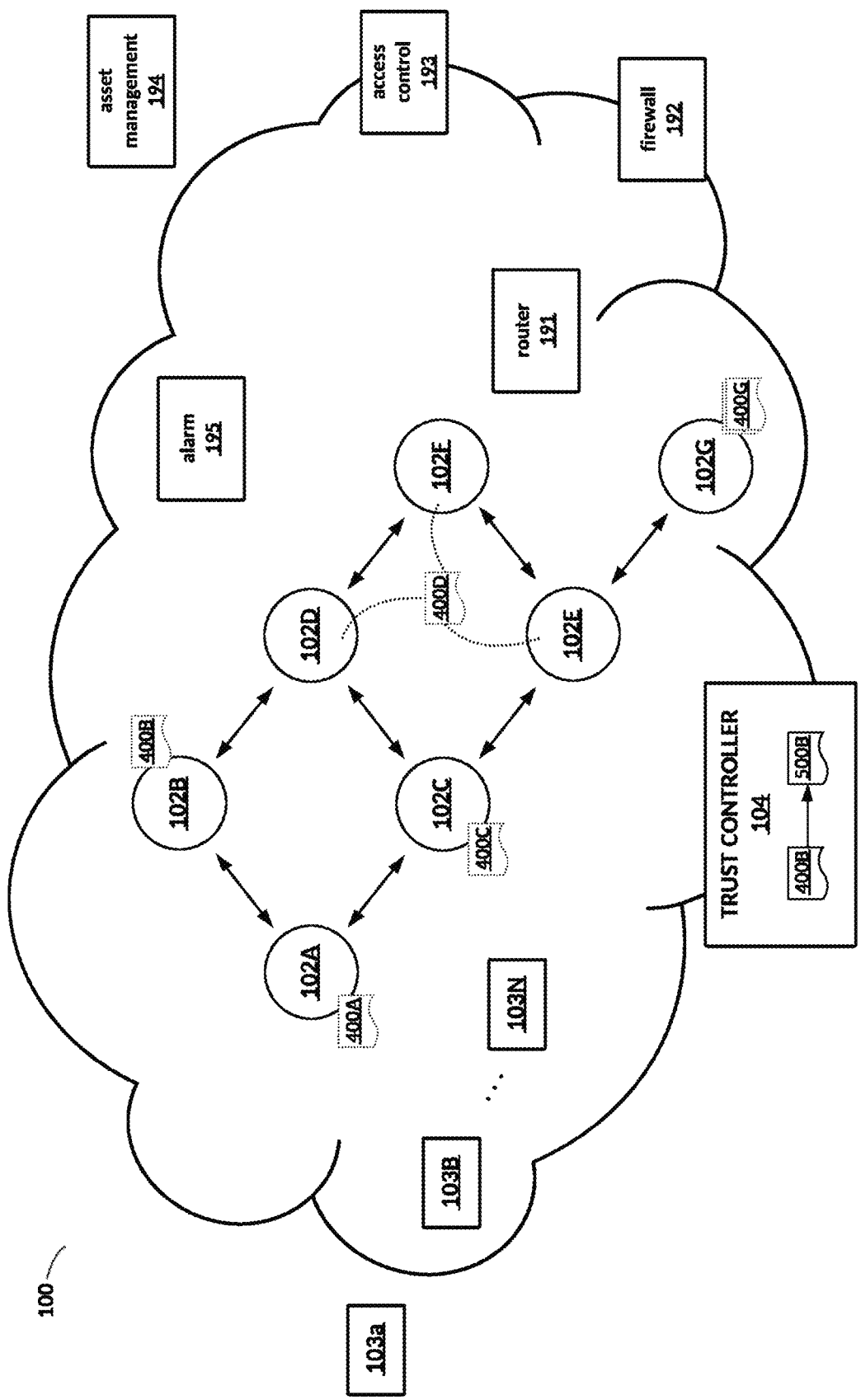
FIG. 1A is a conceptual diagram illustrating an example computer network in which trust scores are calculated, in accordance with one or more aspects of this disclosure.

FIG. 1A is a conceptual diagram illustrating an example computer network 100 in accordance with one or more aspects of this disclosure. Computer network 100 may itself include multiple computer networks, and such computer networks may include private networks (e.g., internal corporate or government networks), virtual private networks, residential networks, or public networks (e.g., cellular communication networks, Internet backbone networks, etc.).

In the example of FIG. 1A, computer network 100 includes a set of network entities 102A through 102G, where "G" may be any number. This disclosure may refer to network entities 102A through 102G collectively as "network entities 102." In general, each of network entities 102 is individually addressable within computer network 100 and can send and receive data on computer network 100.

One or more of network entities 102 may be computing nodes, such as real or virtual endpoint devices (e.g., personal computers, smartphones, tablet computers, server devices, laptop computers, Internet of Things (IOT) devices, wearable devices, etc.) or real or virtual intermediate devices (e.g., routers, switches, firewall devices, virtualized appliances, etc.). In some examples, one or more of network entities 102 may be network services, such as web servers, certain application programming interfaces (APIs), media streaming services, and so on. Other types of network entities may include components, controllers, and routes through computer network 100.

In some examples, each of network entities 102 may have accompanying metadata, such as a device or port description (e.g., which may be configured on the device by an administrator). Such metadata may also include profile names, which may include descriptions of the device as labeled by an administrator or provided by a customer. Metadata associated with one or more of network entities 102 may include website or site names or descriptions of such entities, which may include geographic locations corresponding to where the entity is housed or located.

Also shown in FIG. 1A are input systems 103A through 103N (collectively "input systems 103"). Each of input systems 103 may correspond to or include one or more systems or devices often found on a network. Such systems may include devices that support diagnostic processes implemented within a network (e.g., "trouble ticketing" systems, customer feedback systems, and alarm applications), user devices, and systems to support email, messaging, chat, and/or collaboration applications (e.g., Microsoft Teams or Salesforce.com's Slack platform).

One or more of such input systems 103 may be considered, in some examples, to be "source systems" or "source services" that are responsible for reporting factor values that are used in the calculation of a trust score for one or more network entities 102. For instance, one or more of input systems 103 may operate as a source service that reports the severity of known vulnerabilities applicable to a network device or network entity 102. Although each of input systems 103 are illustrated as being distinct from network entities 102 in FIG. 1A, some input systems 103 may be part of or integrated into a network entity. For example, where an input system 103 monitors metrics for a network entity, a source service or input system 103 might be implemented as a module or other logic that operates within that network entity. Further, in some cases, one or more network entities 102 may monitor and report information about its own operation, and such an example, that network entity may be considered to be acting as a source service or input system 103.

FIG. 1A also illustrates router 191, firewall 192, access control system 193, asset management system 194, and alarm system 195. Router 191 may represent any network device operating as a router on network 100. Firewall 192 may perform functions relating to monitoring incoming and outgoing network traffic for network 100. Access control system 193 may perform functions relating to regulating or limiting access to one or more network entities 102 within network 100 or limiting access to other resources provided by network 100. Asset management system 194 may perform functions relating to managing, administering, and/or accounting for resources within network 100 or even outside of network 100. Alarm system 195 may perform functions relating to detecting conditions for, generating, and/or managing alarms that may be triggered by conditions within network 100.

Like input systems 103, each of router 191, firewall 192, access control system 193, asset management system 194, and alarm system 195 are illustrated in FIG. 1A as being distinct from network entities 102. However, in other examples, one or more of router 191, firewall 192, access control system 193, asset management system 194, and alarm system 195 could be implemented as a network entity 102, or implemented using one or more network entities 102. Also, for ease of illustration, one router 191, firewall 192, access control system 193, asset management system 194, and alarm system 195 is shown in FIG. 1A. Techniques described herein, however, may apply to environments in which any number of routers 191, firewalls 192, access control systems 193, asset management systems 194, and alarm systems 195 are deployed.

As mentioned above, computer networks such as computer network 100 may be designed to operate using a zero-trust networking architecture. The concept of trust arises in not just a security context, but other contexts as well, including contexts involving risk management associated with risks that an organization or business assumes when it relies on a network or devices within the network. However, in a security context, when a computer network operates using a zero-trust networking architecture, numerous authentication and security checks are performed (e.g., each time a service is requested from a network entity in the computer network). Similar processes and checks may be performed in other contexts as well. Performing such checks may be resource intensive and may increase network latency.

Accordingly, to increase network performance in computer networks that operate using trust architectures (for security purposes and otherwise), network administrators may reduce the intensity of checks with respect to specific network entities on an ad hoc basis. While doing so may increase network performance, doing so may undermine the overall security and/or reliability of the network to the extent that there is no systematic methodology for reducing the intensity of checks with respect to individual network entities. Rather, such reductions in the intensity of checks may be based on a network administrator's experience and intuition. This may lead to inconsistencies and misconfigurations in the computer network, e.g., because knowledge of the reductions in the intensity of checks might not be transferred between network administrators. Ultimately, this may lead to adverse outcomes, such as security breaches and network outages.

This disclosure describes techniques that may address one or more of these issues. For instance, as shown in the example of FIG. 1A, computer network 100 includes a trust controller 104. Trust controller 104 is a computing system that comprises one or more computing devices, such as one or more server devices, personal computing devices, or other types of computing devices. In some examples, computer network 100 may be a Wide Area Network (WAN), and trust controller 104 may be part of a WAN controller that manages the WAN. In some examples described herein, trust controller 104 determines a level of trust for network entities 102 in computer network 100. In some examples, a level of trust may be expressed as a number or a trust "score." In other examples, a level of trust may be expressed as a category of trust values that indicate a granular continuum of trust values (e.g., "highly trusted," "trusted," "untrusted," "trust unverified"), or categories of trust values for certain operations ("trusted for data transfer," "trusted for testing,"). In still other examples, a level of trust may be expressed as a binary value (e.g., "trusted" or "untrusted").

Although some examples of this disclosure are described in the context of calculating a "trust score," such examples may alternatively be implemented using a "level of trust." Similarly, examples described in terms of a "level of trust" could also be implemented using a trust score. In that sense, therefore, the terms "trust score" and "level of trust" may, depending on the context, be used herein interchangeably. Often, trust scores can be represented in terms of a percentage, with 100% representing complete trust, and 0% representing no trust.

Additionally, trust controller 104 may use the trust scores for network entities 102 to perform various actions with respect to computer network 100. In some examples, one or more computing systems other than trust controller 104 may determine trust scores and/or use the trust scores for network entities 102 to perform actions with respect to computer network 100. However, for ease of explanation, at least some examples herein describe trust controller 104 as calculating trust scores and performing actions. In such examples, because trust controller 104 determines the trust scores in a predictable, reproducible way, the trust scores may be applied consistently throughout network entities of computer network 100. Thus, inconsistencies associated with ad hoc adjustments to authentication, security, and/or other checking may be reduced and there may be less need for documentation to pass knowledge of security procedures between network administrators.

Trust controller 104 may be implemented as a single trust controller or as (or within) a system (e.g., a hierarchy) of two or more trust controllers. In examples where trust controller 104 is implemented as a system of trust controllers, the trust controllers of trust controller 104 may correspond to specific classes of network entities, different network entities in sub-networks of computer network 100, or other groupings of network entities.

Trust controller 104 may determine trust scores for network entities 102. The trust score for a network entity indicates a level of trust in the network entity. In general, there is greater trust in a network entity if the network entity has previously performed in a manner that is desired by administrators of the network. Conversely, there is less trust in a network entity if the network entity has not performed in a manner that is desired by administrators of network. For example, the trust score for a network entity may indicate low trust if the network entity is known to be compromised by malware, if the network entity is known to generate corrupted data, if the network entity is known to have frequent service outages, if the network entity has known unpatched security flaws, and so on.

To determine a trust score for each of network entities 102, trust controller 104 may use one or more trust score plans 400. Each of network entities 102 in FIG. 1A is shown with an accompanying trust score plan 400. For example, trust score plan 400A is shown adjacent to network entity 102, which is intended to indicate that trust score plan 400A is a trust score plan that can be used to calculate a trust score for network entity 102A. Similarly, trust score plan 400B is shown adjacent to network entity 102B, and trust score plan 400C is shown adjacent to network entity 102C. Some trust score plans 400 may be applicable or used by multiple network entities 102. For example, as suggested in FIG. 1A, trust score plan 400D is associated with and can be used by network entities 102D, 102E, and 102F. Such sharing of trust score plan 400D may be appropriate if each of network entities 102C, 102D, and 102E have common characteristics (e.g., are identical devices, are produced by the same manufacturer, perform similar functions, and/or are otherwise similar).

In addition, some entities may have multiple trust score plans 400. In the example of FIG. 1A, multiple trust score plans 400G are shown adjacent to network entity 102G. Multiple plans for a given entity are often appropriate, particularly if there are reasons to calculate a trust score for different purposes or in different contexts (e.g., for a normal operating environment, for an environment where an alarm is active in the network, or for use in a demonstration or training exercise).

Entities may have default trust score plans, which may be based on common or typical usage patterns for the given entity. For instance, for entities 102 that represent a physical network device, the manufacturer of the network device may ship the device with a default trust score plan that is intended to be appropriate for typical uses of the network device. Such a default trust score plan may be based on publicly-available standards documents that specify rules pertaining to how the device should be configured to meet the needs of typical or even specific uses of the network device. In some examples, similar network devices manufactured by different vendors may be associated with different default trust score plans.

In some cases, there may be multiple standardized or default trust score plans for a network device, depending on how the network device is to be used. For example, one default plan may be based on a set of standards that generally apply in a secure networking context (e.g., based on standards published Center for Internet Security or "CIS"). Another default plan may be based on a different set of standards that might apply to governmental deployment of the device (e.g., Defense Information Systems Agency or "DISA" requirements). A third default plan may be based on a different set of standards that apply to use of the device in the healthcare industry (e.g., Health Insurance Portability and Accountability Act or "HIPAA" requirements). In some cases, trust score plans 400 generated based on one or more of such standards may be manually created by the manufacturer of the network device, and included with the network device or otherwise made available to users. It may be possible, however, to generate such trust score plans 400 automatically based on parsing the requirements, rules, and/or specifications published by standards organizations.

In general, each of trust score plans 400 may define a different way to calculate a trust score for given entity. Since trust can be used in a variety of decision-making processes involving entities (e.g., network entities 102 of network 100), enabling a flexible way to calculate trust scores can be advantageous, since trust scores can differ based on context. For example, a specific network entity 102 operating in network 100 in FIG. 1A might have a high trust score (and be afforded a high amount of trust) based on its hardware and software characteristics. However, if that same network entity 102 was deployed in a different network, where that different network might be used for a different purpose in a different environment, those same hardware and software characteristics of network entity 102 might not be sufficient to confer any significant trust. Accordingly, the concept of a trust score should be flexible, since not all networks are the same, not all uses and purposes for trust scores are the same, and not all contexts are the same.

As described herein, a trust score plan enables an ability to define how to calculate a trust score for a given entity. A trust score plan may define and/or describe a list of trust factors within each of a number of trust factor categories. The trust score plan may also define how each of those factors contribute to an overall trust score. A different trust score plan may be used to customize how trust scores can be calculated for different environments, contexts, purposes, customers, deployments, network segments (e.g., core network, edge network, metro deployment), and/or service types (IP v4, IP v6, streaming, Voice Over IP). In some examples, trust score plans may be used to help meet quality of service standards for particular environments, customers, or deployments. Still further, trust score plans may be used for different customer classes, so that customers operating in a governmental context can use trust score plans that adhere to DISA standards, customers in healthcare industries can use trust score plans that adhere to HIPAA standards, and customers in other industries can use trust score plans that adhere to applicable standards in such other industries.

As described herein, trust scores may be calculated by trust controller 104, and trust score plans 400 may be stored at a location enabling convenient access by trust controller 104. Therefore, although some trust score plans 400 are illustrated in FIG. 1A next to illustrations of various network entities 102, such trust score plans are not necessarily stored at each such network entity 102. Instead, such trust score plans 400 may be stored in a data store within trust controller 104. Therefore, in FIG. 1A, trust score plans 400 shown near a given network entity 102 are illustrated with dotted lines, which is intended to indicate that such trust score plans 400 are merely associated with a given network entity 102, rather than necessarily stored at such network entities 102.

In accordance with one or more aspects of the present disclosure, trust controller 104 may collect information about one or more network entities 102. For instance, in an example that can be described with reference to FIG. 1A, each of input systems 103 collects information about one or more of network entities 102. Such collected information may pertain to the operation of each network entity 102, and may include metrics, information about configurations of each network entity 102, and/or information about operations performed by each of network entities 102. Information about operations performed may include, for example, amount of traffic processed, errors logged, reboots required, and other information. Such input systems 103 send signals that include the collected information to trust controller 104. Trust controller 104 stores the collected information for later use. Alternatively, or in addition, one or more of network entities 102 independently report information about their operation to trust controller 104. Such information may also include metrics, information about configurations, and/or information about operations performed. Trust controller 104 stores any information received from network entities 102.

Trust controller 104 may prepare to calculate a trust score. For instance, continuing with the example being described in the context of FIG. 1A, trust controller 104 detects a signal (i.e., a "trigger") that it determines corresponds to a command or request to calculate a trust score for one or more of network entities 102. In response to the signal, trust controller 104 identifies a network entity 102 for which a trust score is to be calculated. In one specific example, trust controller 104 determines that the signal includes a request to calculate a trust score for network entity 102B. Trust controller 104 identifies trust score plan 400B as an appropriate plan to use to calculate a trust score for network entity 102B. In some examples, trust score plan 400B might be a default trust score plan for network entity 102B. In other examples, trust score plan 400B might be a trust score plan that has been customized by an administrator to meet the specific use context of network entity 102B within network 100. Trust controller 104 accesses trust score plan 400B in order to calculate a trust score for network entity 102B.

Trust controller 104 may perform calculations to generate trust score result 500B for network entity 102B. For instance, still referring to FIG. 1A, trust controller 104 interprets trust score plan 400B and applies trust score plan 400B to information stored at trust controller 104. Such stored information may include the information previously sent to trust controller 104 by input systems 103 and/or network entities 102. In most cases, the stored information used when applying trust score plan 400B to generate trust score result 500B will primarily pertain to network entity 102B, since trust controller 104 is seeking to calculate a trust score for network entity 102B. However, it is possible that information about other network entities 102 could be used. Based on the stored information and the specification outlined in trust score plan 400B, trust controller 104 generates trust score result 500B. In some examples, trust score result 500B may include multiple supporting documents and/or reports underlying the trust score calculations, as further illustrated in connection with FIGS. 5A, 5B and 5C. Included within trust score result 500B may be a specific composite trust score value or percentage value that represents the trust score for network entity 102B.

Trust controller 104 may adjust the operation of network 100 based on the trust score value for network entity 102B. For instance, again referring to FIG. 1A, trust controller 104 may determine that trust score result 500B (or the composite trust score value included within trust score result 500B) suggests that network entity 102B cannot be trusted in the context defined or represented by trust score plan 400B. In such an example, trust controller 104A may take action to limit use of network entity 102B within network 100, given its lack of trustworthiness. In another example, trust score result 500B may suggest that network entity 102B can be trusted, and in such an example, trust controller 104 may enable network entity 102B to play a larger role or process additional data within network 100.

Trust score plans may describe how to calculate a trust score in terms of contribution classes and factors within those contribution classes. Contribution classes are classes of information that contribute to the trust score for a network entity. In some examples, the contribution classes include one or more of a set of prerequisites for the network entity, a set of variable factors for the network entity, and/or a set of reputational factors for the network entity.

In some examples, a trust score calculation may be a function of separate sub-scores for each of the contribution classes. For instance, there may be a first sub-score for the prerequisites for the network entity, a second sub-score for the variable factors for the network entity, and a third sub-score for the reputational factors for the network entity. In some examples, the sub-score for a contribution class is expressed as a percentage of a highest possible sub-score for the contribution class. In other examples, sub-scores for contribution classes are expressed in other ways. Trust controller 104 may use the sub-scores for the contribution classes (e.g., the first, second, and third sub-scores) for the network entity to determine the trust score for the network entity. Thus, the trust score for the network entity may be the result of a mathematic computation that is based on one or more of the prerequisites for the network entity, the variable factors for the network entity, and/or the reputational factors for the network entity.

Each of the prerequisites for the network entity is, in general, a condition that must be satisfied for the trust score for the network entity to have a value greater than a minimum value (e.g., zero). In this disclosure, a trust score for a network entity having the minimum value generally means that the lowest trust level (e.g., no trust) is afforded to the network entity. In some examples, the minimum value may be equal to zero. However, values other than zero may be used to represent a trust score indicating no trust.

The variable factors for a network entity correspond to current characteristics of the network entity. Example characteristics of a network entity may include a current configuration of the network entity, a version of the network entity, active features of the network entity, sentiment values or polarity associated with a network entity, and so on. The variable factors may be weighted such that some of the variable factors contribute more to the variable factors sub-score than other ones of the variable factors.

Each of the reputational factors for a network entity may be a function of specified historical events involving the network entity. For example, trust controller 104 modifies the values of reputational factors for a network entity based on behavior of the network entity over time. For example, trust controller 104 may modify the value of one reputational factor based on the number of times that the network entity spontaneously reboots. In another example, trust controller 104 may modify the value of a reputational factor based on the number of times the network entity has been reconfigured.

Trust score plans enable decoupling of factor values and factor contributions from the manner in which a trust score is calculated. Such decoupling simplifies the process of trying different trust score calculations or applying different rules for calculating a trust score. When a source service or input system 103 provides a factor value, it could be used in different score plan calculations with different contributions. Such a factor value might even be used in different factor categories. For example, the same factor might be used as a prerequisite in one trust score plan but as a variable in another trust score plan. In some examples, trust score plans are initially constructed from a small set of coarse-grained factors and later extended to include a larger set of fine-grained factors. Such factors may be based on a standards-based benchmark specification, such as one published by CIS or DISA, as mentioned above. Such a specification may include a number of "benchmark rules" organized into a number of "benchmark rule groups." These rules may outline appropriate requirements and/or configurations for ensuring a specific entity complies with the objective underlying the specification (e.g., network security, governmental standards, health industry requirements). In such an example, a coarse-grained factor might be the aggregate score of a benchmark rule group or even of a complete benchmark. A fine-grained factor might be an individual benchmark rule.

As described herein, trust controller 104 may determine a trust score for a network entity based on several factors. For instance, trust controller 104 may determine a trust score for a network entity based on factors included within one or more contribution classes. In some examples, such factors may include operating characteristics, metrics, sentiment information derived from data collected by one or more of input system 103, network topology, and/or other information.

Where sentiment information is used, such sentiment information may be derived from text associated with one or more of input systems 103, which may include information derived from diagnostic data associated with one or more of network entities 102, such as notes generated by an administrator or comments provided by a user when addressing an issue arising with a network entity 102 in a trouble ticketing system implemented within network 100. In other examples, sentiment information may be derived from text or other information associated with metadata associated with one or more of network entities 102.

In calculating a trust score, trust controller 104 may also consider attributes of entities that separate one entity from another entity. For example, if network entity 102A trusts network entity 102C, and network entity 102C trusts network entity 102E, network entity 102A may trust network entity 102E to some extent, since network entity 102A trusts an entity that also trusts network entity 102E. In such an example, trust controller 104 may increase the trust score for network entity 102E for operations that network entity 102A may perform with network entity 102E (e.g., a transfer of data). Network entity 102A might not have any direct interactions with network entity 102E, but network entity 102A might be able to infer a trust relationship with network entity 102E, based on the trust network entity 102A has in intervening entities (e.g., network entity 102C).

On the other hand, if network entity 102A trusts network entity 102C, but network entity 102C does not trust network entity 102E, then network entity 102A might not trust network entity 102E, since network entity 102C (an entity that network entity 102A trusts) does not trust network entity 102E. In this example, trust controller 104 may decrease the trust score for network entity 102E for operations that network entity 102A may perform with network entity 102E. Network entity 102A may therefore determine a trust inference with respect to network entity 102E that is based on its level of trust with network entity 102C and network entity 102C's level of trust with network entity 102E.

Further details relating to trust scoring, particularly in the context of computer networks, are available in U.S. patent application Ser. No. 16/949,996, filed Nov. 23, 2020, entitled "Trust Scoring of Network Entities in Networks,". Details relating to inferring trust, particularly in the context of computer networks, are available in U.S. patent application Ser. No. 17/474,871, filed Sep. 14, 2021, entitled "Inferring Trust in Computer Networks,". In addition, details relating to assessing trust by performing a sentiment analysis for an entity or device within a system (e.g., a network) are available in U.S. patent application Ser. No. 17/644,555, filed Dec. 15, 2021, entitled "Use of Sentiment Analysis to Assess Trust in a Network,". Further, details relating to use of trust score plans are available in U.S. patent application Ser. No. 17/655,140, filed Mar. 16, 2022, entitled "Use of a Trust Score Plan". The entire content of all of these applications is hereby incorporated by reference.

In accordance with one or more aspects of the present disclosure, an expected amount of work is determined that is associated with applying a remediation action to a network entity. The remediation action may improve a trust score of the network entity. The network entity may comprise a node or a service. A computing system may calculate the trust score for the network entity. The trust score may provide an assessment of a trustworthiness of the network entity based on a set of characteristics for the network entity and one or more historical events. The computing system may use the trust score to identify at least one weakness of the network entity, and to determine a set of candidate remediation actions to address the at least one weakness. For instance, the set of candidate remediation actions may include modifying one or more traffic patterns in the network, limiting access to one or more devices in the network, enabling access to one or more devices in the network, or any of various combinations thereof. The computing system may determine, for each remediation action in the set of candidate remediation actions, an expected amount of work associated with the remediation action. The computing system may select a remediation action from the set of candidate remediation actions, based on the expected amount of work associated with each of the remediation actions. The computing system may perform an operation to execute at least a portion of the selected remediation action.

In some examples, a remediation metric is determined based on the expected amount of work associated with each remediation action in the set of candidate remediation actions. For example, the expected amount of work can differ among different environments or contexts, and calculating different amounts of work in a flexible or configurable manner may be provided. The remediation metric can be quantified using a friction metric related to the remediation action itself, and an inertia metric related to the network entity representing a target for the remediation work. The friction metric may include any of a configuration change, or one or more equipment replacement options. The inertia metric may include any of an internal diversity of the target, or one or more external dependencies on the target.

Figure 1B:
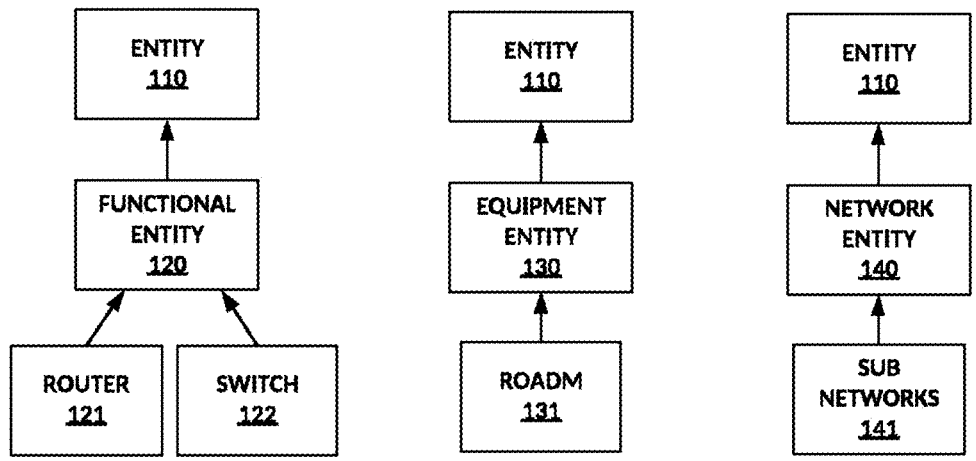
FIG. 1B, FIG. 1C, and FIG. 1D are conceptual diagrams illustrating various types of entity specializations, in accordance with one or more aspects of the present disclosure.
Figure 1C:
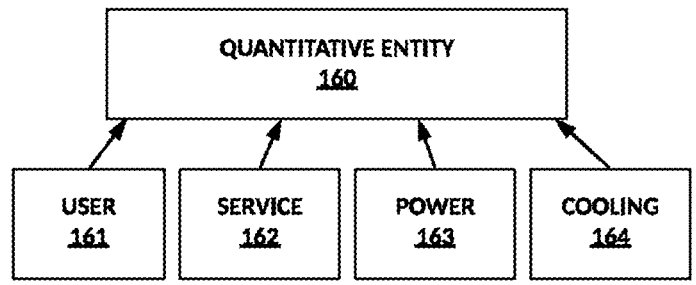
Figure 1D:
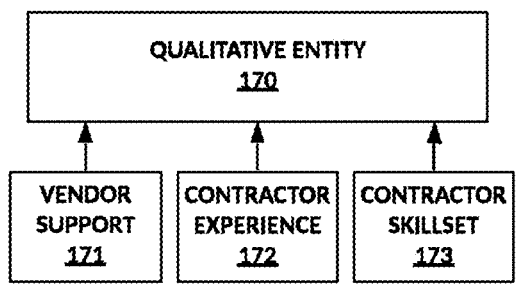

FIG. 1B, FIG. 1C, and FIG. 1D are conceptual diagrams illustrating various types of entity specializations, in accordance with one or more aspects of the present disclosure. For example, FIG. 1B illustrates that an entity can take the form of a functional entity, such as one or more routers 121 or one or more switches 122. As also illustrated in FIG. 1B, an entity could take the form of an equipment entity or a network entity, and represent an aggregation of equipment (e.g., a specific type of equipment, such as a set of reconfigurable optical add-drop multiplexers or "ROADMs") or networks (e.g., subnets or sub networks). The types of entities illustrated in FIG. 1B may generally correspond to the types of entities described in connection with FIG. 1A.

Although FIG. 1A is described in terms of entities that take the form of network entities 102 (e.g., network devices, computing devices, computing services, and the like), the term "entity" may, in other examples, encompass broader concepts. For example, FIG. 1C and FIG. 1D show other types of entities or at least different classifications of entities, such as quantitative entities 160 and qualitative entities 170. Quantitative entities 160 may include users 161, services 162, power attributes 163, cooling attributes 164. Qualitative entities 170 may include other types of entities, perhaps non-physical entities.

In the example of FIG. 1D, qualitative entities 170 include one or more instances of vendor support 171, contractor experiences 172, and/or contractor skillsets 173. Techniques described herein may apply to both quantitative entities 160 and qualitative entities 170 having a trust score. Such a trust score may be defined to some extent based a trust score plan selected for the entity, based on sentiment analysis, and other factors. Where sentiment analysis is used, sentiment can be derived from text or other data associated with information or other data associated with one or more instances of vendor support 171, data associated with contractor experiences 172, and/or data associated with or describing assessments of contractor skillsets 173. Such qualitative entities 170 may be particularly susceptible to a sentiment analysis, given that text describing such entities may be readily available through customer reviews or text-based communications among vendors, contractors, customers, and other personnel.

In addition, a component of a trust score in certain situations may be spatial in nature. For example, as described herein, a trust score may also be defined to some extent based on the level of trust among neighboring entities in a graph, diagram, table, or other arrangement of data.

Figure 2:
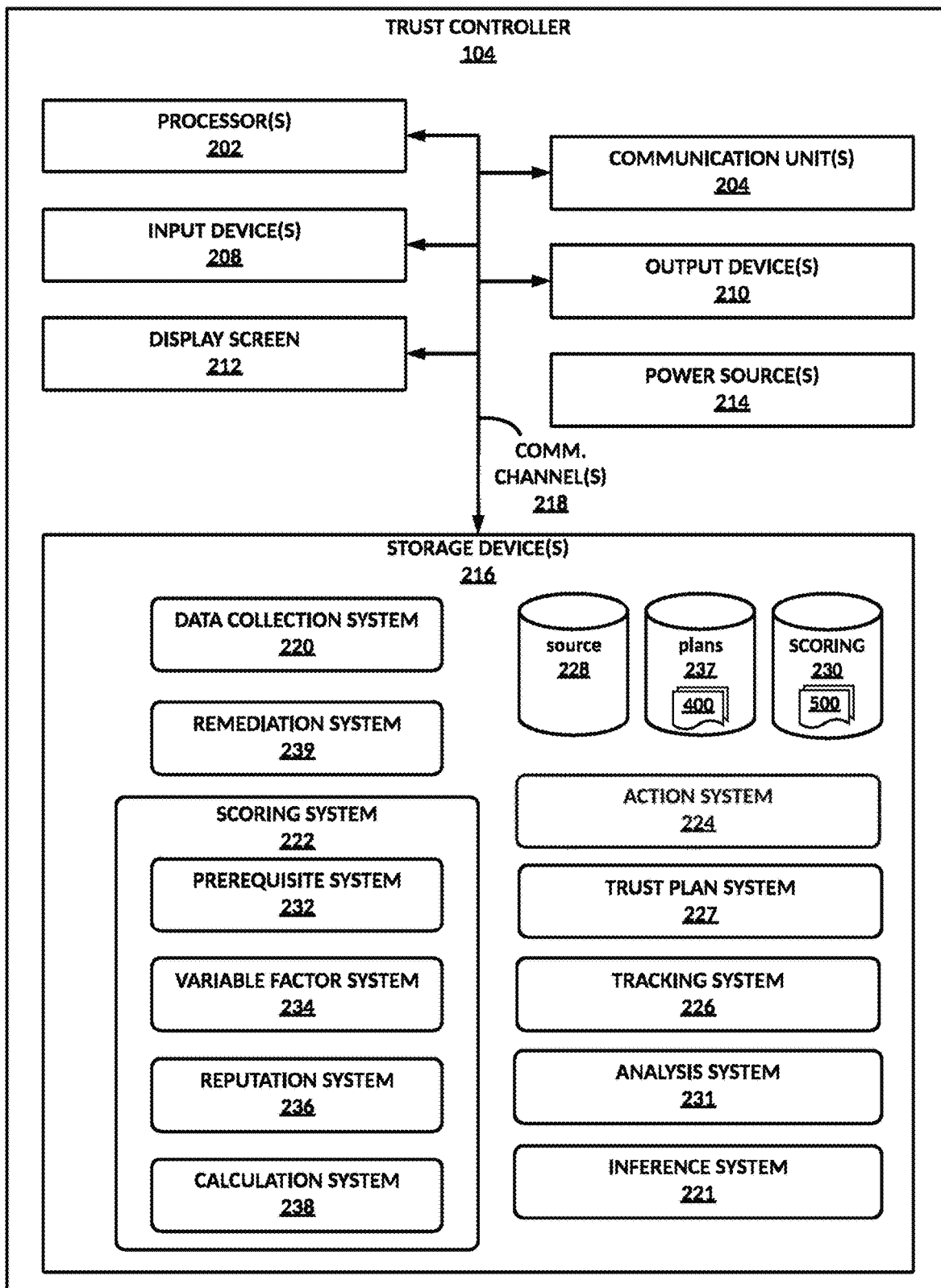
FIG. 2 is a block diagram illustrating example components of trust controller in accordance with one or more aspects of this disclosure.

FIG. 2 is a block diagram illustrating example components of trust controller 104 in accordance with one or more aspects of this disclosure. FIG. 2 illustrates one example of trust controller 104, and this disclosure encompasses any other appropriate configurations of trust controller 104.

As shown in the example of FIG. 2, trust controller 104 includes one or more processors 202, one or more communication units 204, one or more input devices 208, one or more output devices 210, zero or more display screens 212, one or more power sources 214, one or more storage devices 216, and one or more communication channels 218. Trust controller 104 may include other components. For example, trust controller 104 may include physical buttons, microphones, speakers, communication ports, and so on. Communication channel(s) 218 may interconnect each of components 202, 204, 208, 210, 212, and 216 for inter-component communications (physically, communicatively, and/or operatively). In some examples, communication channel(s) 218 may include a system bus, a network connection, an inter-process communication data structure, or any other method for communicating data. Power source(s) 214 may provide electrical energy to components 202, 204, 208, 210, 212 and 216.

Storage device(s) 216 may store information required for use during operation of trust controller 104. In some examples, storage device(s) 216 have the primary purpose of being a short-term and not a long-term computer-readable storage medium. Storage device(s) 216 may include volatile memory and may therefore not retain stored contents if powered off. In some examples, storage device(s) 216 includes non-volatile memory that is configured for long-term storage of information and for retaining information after power on/off cycles. In some examples, processor(s) 202 of trust controller 104 may read and execute instructions stored by storage device(s) 216.

Trust controller 104 may include one or more input devices 208 that trust controller 104 uses to receive user input. Examples of user input include tactile, audio, and video user input. Input device(s) 208 may include presence-sensitive screens, touch-sensitive screens, mice, keyboards, voice responsive systems, microphones, motion sensors capable of detecting gestures, or other types of devices for detecting input from a human or machine.

Communication unit(s) 204 may enable trust controller 104 to send data to and receive data from one or more other computing devices (e.g., via a computer network, such as a local area network or the Internet). For instance, communication unit(s) 204 may be configured to receive data from network entities 102. In some examples, communication unit(s) 204 may include wireless transmitters and receivers that enable trust controller 104 to communicate wirelessly with the other computing devices. Examples of communication unit(s) 204 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Additionally, trust controller 104 may use communication unit(s) 204 to communicate with one or more other devices.

Output device(s) 210 may generate output. Examples of output include tactile, audio, and video output. Output device(s) 210 may include presence-sensitive screens, sound cards, video graphics adapter cards, speakers, liquid crystal displays (LCD), light emitting diode (LED) displays, or other types of devices for generating output. Output device(s) 210 may include display screen 212. In some examples, output device(s) 210 may include virtual reality, augmented reality, or mixed reality display devices.

Processor(s) 202 may include processing circuitry configured to perform various actions. Processor(s) 202 may be configured to read instructions from storage device(s) 216 and may execute instructions stored by storage device(s) 216. Execution of the instructions by processor(s) 202 may configure or cause trust controller 104 to provide at least some of the functionality ascribed in this disclosure to trust controller 104 or components thereof (e.g., processor(s) 202). As shown in the example of FIG. 2, storage device(s) 216 include computer-readable instructions associated with a data collection system 220, a scoring system 222, an action system 224, trust plan system 227, tracking system 226, analysis system 231, and inference system 221. In the example of FIG. 2, storage device(s) 216 may also include source data 228, trust plan data store 237, and scoring data 230. Furthermore, as shown in the example of FIG. 2, the computer-readable instructions associated with scoring system 222 may include computer-readable instructions associated with a prerequisite system 232, a variable factor system 234, a reputation system 236, and a calculation system 238. In other examples, storage device(s) 216 may include computer-readable instructions associated with other systems or modules.

Data collection system 220 is configured to collect data regarding network entities 102. For example, data collection system 220 may query log data of network entities as part of collecting the data regarding network entities 102. In some examples, data collection system 220 may be configured to collect configuration and performance data regarding the network entities. The configuration and performance data may include snapshots of configuration data, snapshots of alarm data, and logs. Data collection system 220 may also collect information about network topology, enabling a determination of which network entities 102 are neighbors (i.e., are adjacent to each other in a network topology), and enabling collection and storage of other information about the network (e.g., network paths and routes through the network). Source data 228 may include the data collected by data collection system 220.

Data collection system 220 may also be configured to collect data that can be used to perform sentiment analysis. For example, data collection system 220 may integrate with one or more of input systems 103 (e.g., a trouble ticketing system) to collect the data relating to diagnostic or trouble-shooting performed for one or more of network entities 102. In some examples, data collection system 220 may be configured to collect information from email, messaging, chat, and/or collaboration applications or other subjective material sources. Data collection system 220 may also collect information from one or more user devices, where such user devices are configured to present a user interface and collect comments from users about one or more of network entities 102. In one example, such a user interface may present a simplified free form comment box through a user interface, and prompt or enable users to input any comments they want regarding the trust of one or more of network entities 102. In such an example, data collection system 220 may collect such input and make the data available for subsequent sentiment analysis as described herein.

Data collection system 220 may store (as source data 228) sentiment information having a form other than simply text and user comments. For instance, in some examples, sentiment information could include information about a status or a change of state. In one such example, a user might provide a comment like "physical security in this site is badly maintained." If this comment is later removed (or otherwise nullified), sentiment information (e.g., "state information") having a sentiment polarity that is opposite to that of the original comment might be generated and stored within data collection system 220 as source data 228.

Scoring system 222 may use source data 228 to determine trust scores for network entities 102. Scoring data 230 may include the trust scores determined by scoring system 222 for network entities 102. In the example of FIG. 2, prerequisite system 232 may determine prerequisite sub-scores for network entities 102. Variable factor system 234 may determine variable factor sub-scores for network entities 102. Reputation system 236 may determine reputation sub-scores for network entities 102. Calculation system 238 may use one or more of the prerequisite sub-scores for a network entity, a variable factor sub-score for the network entity, or the reputation sub-score for the network entity to determine the trust score for the network entity.

Prerequisite system 232 may determine prerequisite sub-scores for network entities 102. That is, prerequisite system 232 may determine the trust score for a network entity based one or more prerequisites. Each of the prerequisites is a condition that must be satisfied for the trust score for a network entity not to have the minimum value. Prerequisite system 232 may evaluate the conditions to determine the prerequisite sub-score for a network entity. Prerequisite system 232 may store the prerequisite sub-scores for network entities 102 as scoring data 230. Example conditions may include whether the network entity is using a certified software release, whether the network entity is using a certified hardware release, and so on. Other prerequisites may include the network entity not using software versions that are known to be vulnerable, the network entity using only supported software or hardware versions, the network entity having the correct network time settings, the network entity having correct certificates for transport layer security (TLS) loaded, and so on. The conditions may be user-defined.

Variable factor system 234 may determine variable factor sub-scores for network entities 102. In other words, variable factor system 234 may assess sub-scores for each of several characteristics of a network entity. Each of the one or more variable factors for a network entity corresponds to one or more of the characteristics of the network entity. Variable factor system 234 may store the variable factor sub-scores for network entities 102 as scoring data 230. The characteristics may be user-defined. Examples of characteristics may include:

Use of only approved applications on the network entity.
Use of only signed applications on the network entity.
Whether a release version of the network entity is a known-good version.
A state or configuration of a network entity, e.g., if a recommended configuration is applied or not.
Whether a software release version of a software application of the network entity is within a given number of releases of a current version of the software application.
Rate limits for requests to be processed by a routing engine of a router.
Limits on rates of possible network management interactions per time-period.
Password strength requirements.
Numbers and types of open network ports,
Whether cryptographic keys are renewed more frequently than a threshold time limit.
Sentiment analysis associated with a network entity, which may be determined by analysis system 231, as further described below.

Trust controller 104 may determine a trust score for a network entity based on several factors, each of which may be defined in a trust score plan. For instance, trust controller 104 may determine a trust score for a network entity based on factors included within one or more contribution classes. In some examples, such factors may include operating characteristics, metrics, sentiment information derived from data collected by one or more of input system 103, or other information.

Contribution classes are classes of information that contribute to the trust score for a network entity. In some examples, the contribution classes include one or more of a set of prerequisites for the network entity, a set of variable factors for the network entity, and/or a set of reputational factors for the network entity.

In some examples, there may be a separate sub-score for each of the contribution classes. For instance, there may be a first sub-score for the prerequisites for the network entity, a second sub-score for the variable factors for the network entity, and a third sub-score for the reputational factors for the network entity. In some examples, the sub-score for a contribution class is expressed as a percentage of a highest possible sub-score for the contribution class. In other examples, sub-scores for contribution classes are expressed in other ways. Trust controller 104 may use the sub-scores for the contribution classes (e.g., the first, second, and third sub-scores) for the network entity to determine the trust score for the network entity. Thus, the trust score for the network entity may be the result of a mathematic computation that is based on one or more of the prerequisites for the network entity, the variable factors for the network entity, and/or the reputational factors for the network entity.

Each of the prerequisites for the network entity is, in general, a condition that must be satisfied for the trust score for the network entity to have a value greater than a minimum value (e.g., zero). In this disclosure, a trust score for a network entity having the minimum value means that a lowest trust level (e.g., no trust) is afforded to the network entity. In some examples, the minimum value may be equal to zero. However, values other than zero may be used to represent a trust score indicating no trust.

The variable factors for a network entity correspond to current characteristics of the network entity. Example characteristics of a network entity may include a current configuration of the network entity, a version of the network entity, active features of the network entity, sentiment values or polarity associated with a network entity, and so on. The variable factors may be weighted such that some of the variable factors contribute more to the variable factors sub-score than other ones of the variable factors.

Each of the reputational factors for a network entity may be a function of specified historical events involving the network entity. For example, trust controller 104 modifies the values of reputational factors for a network entity based on behavior of the network entity over time. For example, trust controller 104 may modify the value of one reputational factor based on the number of times that the network entity spontaneously reboots. In another example, trust controller 104 may modify the value of a reputational factor based on the number of times the network entity has been reconfigured.

Where sentiment information is used to calculate or modify a trust score, such sentiment information may be derived from text associated with one or more of input systems 103, which may include information derived from diagnostic data associated with one or more of network entities 102, such as notes generated by an administrator or comments provided by a user when addressing an issue arising with a network entity 102 in a trouble ticketing system implemented within network 100. In other examples, sentiment information may be derived from text or other information associated with metadata associated with one or more of network entities 102.

In calculating a trust score, trust controller 104 may also consider attributes of entities that separate one entity from another entity. For example, if network entity 102A trusts network entity 102C, and network entity 102C trusts network entity 102E, network entity 102A may trust network entity 102E to some extent, since network entity 102A trusts an entity that also trusts network entity 102E. In such an example, trust controller 104 may increase the trust score for network entity 102E for operations that network entity 102A may perform with network entity 102E (e.g., a transfer of data). Network entity 102A might not have any direct interactions with network entity 102E, but network entity 102A might be able to infer a trust relationship with network entity 102E, based on the trust network entity 102A has in intervening entities (e.g., network entity 102C).

On the other hand, if network entity 102A trusts network entity 102C, but network entity 102C does not trust network entity 102E, then network entity 102A might not trust network entity 102E, since network entity 102C (an entity that network entity 102A trusts) does not trust network entity 102E. In this example, trust controller 104 may decrease the trust score for network entity 102E for operations that network entity 102A may perform with network entity 102E. Network entity 102A may therefore determine a trust inference with respect to network entity 102E that is based on its level of trust with network entity 102C and network entity 102C's level of trust with network entity 102E.

Analysis system 231 may perform functions relating to sentiment analysis for a given entity. Sentiment analysis information may be used to determine a variable factor sub-score for one or more network entities 102, as described in connection with FIG. 3A and FIG. 3B. Analysis system 231 may apply this analysis as a component of trust. In examples described herein, analysis system 231 may be integrated into scoring system 222 so that variable factor system 234 and calculation system 238 calculate a trust score by considering sentiment analysis associated with network entities or amongst network entities (see calculations associated with Table 1, below). In other examples, however, analysis system 231 may be used to adjust (and thereby improve) trust scores that have already been determined by a scoring system, such as scoring system 222. In such examples, analysis system 231 may apply an adjustment to a trust score for an entity based on attitudinal information or sentiment analysis.

As part of calculating a trust score, variable factor system 234 may apply different weights to different characteristics to determine the variable factor sub-score for a network entity. Thus, specific characteristics may make greater contributions to the variable factor sub-score than other characteristics. Table 1, below, illustrates example contributions of specific choices (possible values) for specific characteristics of a network entity. As shown in the example of Table 1, software applications (apps) may be categorized into a plurality of classes (e.g., Class 1, Class 2, Class 3, etc.). The different classes of apps may correspond to different levels of risk. For instance, Class 1 apps may be limited to apps approved by a system vendor, signed applications, applications with security audits, etc., Class 2 apps may be limited to apps approved by a supplier, unsigned applications, applications with regular security updates, etc., Class 3 apps may be unapproved apps, and so on. In Table 1, the contribution column indicates a score that would be contributed if the corresponding choice in the "choices" column applies. In other examples, one or more choices may be associated with negative values, but the final variable factor sub-score may be limited to a minimum of zero or other predefined minimum value.

In Table 1, the "Sample Score" column provides an example of how a variable factor sub-score may be calculated for a specific network entity. Thus, in the example of Table 1, if the network entity used only Class 1 apps, variable factor system 234 may determine that the contribution for this characteristic ("Software") is 30. If a specific attribute of the network entity (e.g., software) is not a known good release, variable factor system 234 may determine that the contribution for the second characteristic is zero. If the network entity uses a software version that is within 3 releases of the most recent release of the software, variable factor system 234 may determine that the contribution for this third characteristic (e.g., "Software version<=last version−3") is 10. If the sentiment analysis for this network entity indicates a positive polarity, then variable factor system 234 may determine that the contribution for the "Sentiment" characteristic is 20. Based on such assessments, variable factor system 234 may determine that the variable factor sub-score is 60 (30+0+10+20). See Table 1, below.

TABLE 1

| | Characteristics | Contribution | Choices | Sample Score |
|---|---|---|---|---|
| Contributions within variable trust | Software (max 50%) | 30 | Class 1 apps only | 30 |
| | | 20 | Class 1 and Class 2 apps only | |
| | | 10 | Class 1, Class 2 and Class 3 apps | |
| | Is a known-good release | 40 | Yes | 0 |
| | | 0 | No | |
| | Software version <= last-3 | 10 | Yes | 10 |
| | | 0 | No | |
| | Sentiment (max 20%) | 20 | Positive | 20 |
| | | 5 | Neutral | |
| | | 0 | Negative | |
| | Total | | | 60 |

Reputation system 236 may determine reputation sub-scores for network entities 102. The reputation sub-score for a network entity may be based on one or more reputational factors for the network entity. Each of the reputational factors for the network entity is a function of specified historical events involving the network entity. The reputational factors for a network entity may be user-defined. The historical events may be defined to be those events that occur within a specific time period (e.g., 5 weeks, 10 weeks, 6 months, etc.). Reputation system 236 may store the reputation sub-scores for network entities 102 as scoring data 230. Example types of reputational factors may include:

A number of temporal intervals (e.g., weeks, days, etc.) without a reset of the network entity.

A number of temporal intervals (e.g., weeks, days, etc.) without a reboot of the network entity.

A number of failed log-ins.

Log-in frequency.

Configuration frequency.

A number of protocol timeouts or other runtime data

Table 2, below, illustrates an example of how reputation system 236 may determine the reputation sub-score for a network entity. For instance, in Table 2, reputation system 236 may increase a reputation sub-score for the network entity by 5 for each month in which the network entity did not experience a reset. Furthermore, in Table 2, reputation system 236 may increase the reputation sub-score for the network entity by 15 for each month in which the network entity did not experience a reboot. Because the considered time period is 5 months, the maximum reputation sub-score, in this example, is 100.

TABLE 2

| | Factor | Choices | Contribution |
|---|---|---|---|
| Relative weights for items within reputation | Reputation per period without reset | | 5 |
| | Reputation per period without reboot | | 15 |
| | Interval | Month | |
| | Length of history considered | 5 | |
| | Maximum | | 100 |

Calculation system 238 may use one or more of a prerequisite sub-score for a network entity, a variable factor sub-score for the network entity, or a reputation sub-score for the network entity to determine the trust score for the network entity. When calculating a trust score for a network entity, calculation system 238 may determine that the trust score for the network entity indicates no trust if one or more of the prerequisite conditions are not satisfied (e.g., if the prerequisite sub-score has the minimum value, such as zero). In some examples, calculation system 238 determines the trust score for a network entity as a sum of the variable factor sub-score and the reputation sub-score. In some examples, calculation system 238 determines the trust score for a network entity as a weighted sum of the variable factor sub-score and the reputation sub-score. For instance, calculation system 238 may apply a 60% weight to the variable factor sub-score and a 40% weight to the reputation sub-score. In some examples, the weights applied to the variable factor sub-score and the reputation sub-score are user-defined. Thus, because the weights applied to the variable factor sub-score and reputation sub-score are user-defined, the ultimate trust score may be dependent on a user's priorities and preferences. In some examples, calculation system 238 may multiply the resulting sum (or weighted sum) by the prerequisite sub-score to determine the trust score for the network entity. In some examples, rather than trust controller 104 calculating a prerequisite sub-score, calculation system 238 may simply set the trust score for a network entity to the minimum value (e.g., zero) if any of the prerequisite conditions are not satisfied. Calculation system 238 may store the trust scores for network entities 102 as scoring data 230. In some examples, the trust scores for network entities 102 may include one or more trust score results. Such trust score results may also be stored as scoring data 230.

In some examples, scoring system 222 may aggregate the trust scores for two or more of network entities 102 to determine a trust score for a higher-order network entity. Example types of higher-order network entities may include networks, services, routes, and/or other collections of one or more network entities. Scoring system 222 may aggregate the trust scores in one of a variety of ways. For example, scoring system 222 may aggregate the trust scores for two or more of network entities 102 to determine a trust score for a higher-order network entity by taking the lowest trust score of the two or more network entities as the trust score for the higher-order network entity. In another example, scoring system 222 may aggregate the trust scores for two or more of network entities 102 to determine a trust score for a higher-order network entity as an average or sum of the trust scores for the two or more network entities.

Action system 224 may perform one or more actions based on the trust scores determined for network entities 102 by scoring system 222. For example, action system 224 may modify a traffic pattern of computer network 100 based on the trust score for the network entity. For instance, in this example, based on the trust score for the network entity, action system 224 may change the traffic pattern in computer network 100 to divert network traffic away from or direct the network traffic to the network entity. For instance, if the trust score for a network entity is below a specific threshold, action system 224 may change the traffic pattern in computer network 100 to divert network traffic away from the network entity. In some examples, if the trust score for a network entity is above a specific threshold, action system 224 may change the traffic pattern in computer network 100 to direct network traffic to the network entity. In such an example, based on a trust score of a network entity being greater than a particular threshold, action system 224 may change the traffic pattern by sending instructions to one or more routers in computer network 100 that cause the routers to change routes in computer network 100, and thereby cause those routers to route packets so that packets are directed along routes that lead to or through the network entity.

In another example, action system 224 may determine that there is a conflict of information between two sensors (e.g., in the context of an airplane, an angle of attack sensor and a nose pitch sensor). In this example, action system 224 may perform one or more actions based on the trust scores for the sensors (i.e., network entities) in response to determining such a conflict. For instance, action system 224 may generate a notice to an operator recommending use of information from the sensor with a greater trust score. In another example, action system 224 may disable the sensor with the lower trust score. In some examples, action system 224 may recommend a probe or obtain a combination of other sensor data to determine which of the two sensors is more likely to be generating accurate data. In an example where the network entities include multiple clock sources (e.g., Precision Time Protocol (PTP) clock sources), action system 224 may change a master clock source from a current clock source to a back-up clock source due to the back-up clock source having a greater trust score than the current clock source. In some examples, action system 224 may identify routes through network 100 based on trust scores for network entities in network 100. Thus, action system 224 may configure routers to route network traffic along routes that pass-through network entities having high trust scores.

Action system 224 may also perform other types of actions based on the trust scores determined for network entities 102 by scoring system 222. For instance, action system 224 may determine or adjust configurations associated with firewall 192 based on a trust score for network entity 102A that is below a specified trust threshold. Such an adjustment may minimize or limit ports on firewall 192 that enable interaction with network entity 102A. In another example, action system 224 may interact with one or more of access control system 193 to limit access to devices with trust scores below a threshold. Action system 224 may interact with asset management system 194 to mark one or more devices as unavailable when a trust score is below a certain threshold, or where the trust score is trending downward. Action system 224 may also raise alarms to indicate that trust scores associated with one or more of network entities 102 are low, are trending lower, and/or have trended below a given threshold.

Trust plan system 227 may perform functions relating to identifying, interpreting, and/or applying one or more trust score plans 400 when calculating trust scores and/or generating trust score results 500. Trust plan system 227 may use one or more trust score plans 400 in order to determine how to calculate a trust score. Trust plan system 227 may be capable of parsing trust score plans 400 to identify contribution classes, trust factors, contribution values, and contribution factors. Trust plan data store 237 may be primarily maintained by trust plan system 227.

Tracking system 226 may track changes in trust scores and/or sub-scores and re-evaluate the level of trust associated with one or more entities. Tracking system 226 may collect information from source data 228 and determine changes in trust scores and/or sub-scores associated with one or more network entities 102. Tracking system 226 may determine, based on historical information about trust scores for each of network entities 102, which of network entities 102 need service, such as an upgrade, audit, review, test, or other evaluation. Tracking system 226 may monitor sentiment associated with one or more network entities 102, and adjust trust scores as that sentiment changes. In some examples, tracking system 226 may also identify one or more network entities 102 having consistently high trust scores and implement a tendency to use such network entities 102 for high priority, high importance, or mission-critical tasks.

Remediation system 239 may perform functions related to determining the friction metric and the inertia metric, weighing the friction metric and the inertia metric, and determining the remediation metric from the weighted friction metric and the weighted inertia metric. In some examples, remediation system 239 receives a trust score for a network entity from the trust plan system 227. The remediation system 239 may perform one or more of: identifying at least one weakness of the network entity based on the received trust score; determining a set of remediation actions for addressing the at least one weakness; determining, for each remediation action of the set of remediation actions, an expected amount of work associated with the remediation action; selecting a remediation action from the set of remediation actions, based on the determining, for each remediation action, the expected amount of work associated with the remediation action; and performing an operation to execute at least a portion of the selected remediation action.

Inference system 221 may perform functions relating to inferring trust scores for a given entity based on a distance, separation, or locality of that entity from the perspective of another entity. Inference system 221 may apply this inferred trust as a component of trust or as a degree of trust. In some examples, inference system 221 may be used to adjust (and thereby improve) trust scores determined by scoring system 222. In such an example, inference system 221 may apply an adjustment to a trust score for an entity that is based on a degree of separation between an entity and another entity whose trust is being assessed, where the degree of separation corresponds to a distance, a count of intervening entities, or a locality associated with the entity being assessed.

For example, in FIG. 1A, if network entity 102E has a trust score of 70, network entity 102C, which is adjacent to network entity 102E, may view network entity 102E as having a trust score of 70. If network entity 102C has trust score 80, then network entity 102A, which is adjacent to network entity 102C, may view network entity 102C as having a trust score of 80. However, the trust score that network entity 102A associates with network entity 102E may be a function of the trust scores for network entity 102C, network entity 102E, and the number of intervening network entities between network entity 102A and 102E. Such a function may be described as follows:

trust score of 102A = function (trust score of 102C, trust score of 102E, count of intervening entities between 102A and 102E)

Where the count of intervening entities is high, the trust score may be reduced. Where the count is low, the trust score may be higher.

In other examples, inference system 221 may be integrated into scoring system 222 so that calculation system 238 calculates a trust score by considering inferences about trust amongst network entities 102.

In an example where inference system 221 or aspects of inference system 221 are integrated into scoring system 222, both variable factor system 234 and reputation system 236 may use trust inferences or information derived from trust inferences to make variable and reputational assessments, respectfully. Variable factor system 234 may recalculate trust scores, for example, as new entities get added and new trust inferences are determined. Reputation system 236 may assess whether trust inferences between entities improve or deteriorate over time. In such an example, Tables 1 and 2, described above, might be modified and relabelled as Tables 1A and 2A, as follows:

TABLE 1A

| Characteristics | | Contribution | Choices | Sample Score |
|---|---|---|---|---|
| Contributions within variable trust | Software (max 50%) | 30 | Class 1 apps only | 30 |
| | | 20 | Class 1 and Class 2 apps only | |
| | | 10 | Class 1, Class 2, and Class 3 apps | |
| | Is a known-good release | 40 | Yes | |
| | | 0 | No | 0 |
| | Software version <= last-3 | 10 | Yes | 10 |
| | | 0 | No | |
| | Sentiment (max 20%) | 20 | Positive | 20 |
| | | 5 | Neutral | |
| | | 0 | Negative | |
| | Change in degree of separation | 0-N | Range | 4 |
| Total | | | | 64 |

TABLE 2A

| | Factor | Choices | Contribution |
|---|---|---|---|
| Relative weights for items within reputation | Reputation per period without reset | | 5 |
| | Reputation per period without reboot | | 15 |

TABLE 2A-continued

| Factor | Choices | Contribution |
|---|---|---|
| Interval | Month | |
| Length of history considered | 5 | |
| Change in neighbor score | 3 | 4 |
| Maximum | | 100 |

Scoring system 222 may use trust inferences or information derived from such trust inferences to supplement existing metrics, thereby improving accuracy of scoring system 222. In general, inference system 221 may receive information from and output information to one or more other systems or modules within storage devices 216, and may otherwise interact with and/or operate in conjunction with one or more other systems and/or modules of trust controller 104.

Various systems illustrated in FIG. 2 (e.g., data collection system 220, inference system 221, scoring system 222, action system 224, tracking system 226, prerequisite system 232, variable factor system 234, reputation system 236, calculation system 238) may be implemented as modules or other logic. In such an example, such modules illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

In some examples, the remediation metric measures an expected or inherent amount of work associated with performing the remediation action. The remediation metric may comprise a friction metric and an inertia metric. The friction metric may relate to a change associated with the remediation action, and might not be specific to a given network entity. The friction metric may indicate a confidence level that the change can be successfully applied, and may be independent of any other characteristics of the network entity.

In some examples, the friction metric can be determined by extracting one or more files from an extensible configuration checklist description format (XCCDF) document. XCCDF is an extensible markup language (XML) specification defined by the National Institute of Standards and Technology (NIST), and describes rules for conforming to security standards. These rules specify a certain minimum number of parameters that may be provided by the XCCDF document. For example, a loopback interface may be defined and configured as follows:

hostname (config) #interface loopback number
hostname (config-if) #ip address loopback_ip_address loopback_subnet_mask Accordingly, the loopback interface may require three parameters. The friction metric can be a function of a number or quantity of required parameters. Friction may increase with more parameters. The parameters can be extracted from existing XCCDF documents by the computing system (e.g., remediation system 239 of trust controller 104). In some examples, the one or more parameters comprise any of a sentiment analysis or a polarity score.

In some examples, the friction metric can be determined using a replacement friction. For instance, trust controller 104 may determine the replacement friction based on replacing an existing item of hardware and/or software with a new item of hardware and/or software. The existing item may be identified with an item code such as a stock-keeping unit (SKU). One or more item codes and/or SKUs that are reaching an end-of-life may be identified. The replacement friction may include a lead time for applying the remediation. The lead time may include one or more of a first lead time for ordering hardware, or a second lead time for applying software.

FIG. 3 illustrates an example of hardware data 300 that can be used to determine the friction metric, in accordance with one or more aspects of this disclosure. An existing line card is to be replaced by a new line card. The existing line card, designated as model number EX9200, has a termination date of Mar. 31, 2022 for service and support. The replacement line card, designated as model number EX9200-12QS, has a service termination date of Mar. 31, 2027. The latest software version for the replacement line card is version 22.2R1. In this example, the friction metric can be at least partially based on a lead time of replacing the existing line card with the new line card.

In some examples, no one-to-one replacement may be defined for an existing hardware and/or software item that has reached its end-of-life. Accordingly, the friction metric may incorporate an amount of time needed for an engineer, technician, operator, or other personnel to locate a suitable replacement for the end-of-life item. When multiple choices exist for the replacement, the friction metric may incorporate an amount of time needed to select from among the available options. When only a single choice exists for the replacement, there is no need to spend time determining a best or most suitable option and, thus, the friction metric can be adjusted accordingly.

FIG. 4 illustrates an example of hardware data 400 for determining friction metrics for a plurality of network entities, in accordance with one or more aspects of the present disclosure. Each row 401 of the hardware data 400 corresponds to a particular hardware item and can be prepared from data received from a manufacturer or distributor. Replacing a hardware item may require ordering the replacement item, physically removing the existing device, and installing the replacement device. These processes may require more time and preparation than for software-only updates and bug fixes. For this reason, hardware items may be associated with higher friction metrics than software items.

FIGS. 5A-5G illustrate examples of determining an inertia metric, in accordance with one or more aspects of the present disclosure. Inertia may apply to an entire network entity, such as a device and/or service, to which the remediation action is to be applied. Inertia can be a measure of resistance to change of a hardware and/or software item. Inertia may be independent of the remediation action (i.e., change, per se). FIG. 5A shows an example of calculating the inertia metric from a list of user accounts 500. The list 500 may include a number of management user accounts on a network entity. For example, the user accounts may include any of a command line interface (CLI) or application-level user, such as a Google™ Remote Procedure Call (gRPC), Network Configuration (Netconf), and/or Simple Network Management Protocol (SNMP). FIG. 5B shows an example of calculating the inertia metric from a list 510 of active user sessions and tunnel endpoints that are dependent upon the network entity, such as Virtual Private Network (VPN) users. The list 510 may be unrelated to management accounts and may include, for example, any of Point-to-Point Protocol (PPP) sessions, Internet Protocol Security (IPsec), Media Access Control Security (MACsec), Language Service Protocol (LSP), or others.

FIG. 5C shows an example of calculating the inertia metric from a list 520 of overall traffic volume in a timeframe. The list 520 may include a link level type, such as Ethernet, a link physical media type such as copper, a link mode such as full-duplex, a link speed such as 1,000 mbps, and/or a tabulation of any link errors. FIG. 5D shows an example of calculating the inertia metric from a list 530 of characteristics for one or more logical or physical interfaces. These characteristics may include any of a number, type or capacity for each interface. FIG. 5E shows an example of calculating the inertia metric from a list 540 of enabled features. For example, the features may include any of Border Gateway Protocol (BGP), Integrated Set of Information Systems (ISIS), and/or other features. FIG. 5F shows an example of calculating the inertia metric from a list 550 of inventory-type details per node. For example, the list 550 may include a software version, a part number, a serial number, and a model number for each of a plurality of hardware items. FIG. 5G shows an example of calculating the inertia metric from a list 560 of configuration sizes.

FIG. 6 illustrates an example of determining a remediation metric by applying a relative weighting to the inertia metric and the friction metric, in accordance with one or more aspects of the present disclosure. For instance, assume that a hardware and/or software item is nearing its end-of-life, and that the item is used within two node instances. The two node instances comprise a core Provider (P) node designated as Node A, and a Provider Edge (PE) node designated as Node B. The distinction between the P node and the PE node may impact the trust metric. With reference to table 501, the high-performance P nodes (such as Node A) may have a significant traffic load but little software complexity and limited interface fan-out. By contrast, the PE nodes (such as Node B) may have a low traffic load but high software complexity (many features) and a significant fan-out of interfaces. A relative weight of the friction metric versus the inertia metric may be defined using an approximate ratio of 60:40, such that the friction metric (including the applying of the remediation action) has more weight than the inertia metric (including node-specific considerations for applying the remediation action, such as Node A- and Node B-specific parameters).

FIG. 7 illustrates an example of a scoring table for determining the inertia metric and the friction metric, in accordance with one or more aspects of the present disclosure. In this example, a system, such as trust controller 104, may apply the inertia metric and the friction metric to Node A and Node B (FIG. 6). The scoring table may represent an illustrative scenario where a replacement exists for an end-of-life hardware and/or software item. The trust controller 104 may use and/or consider information included within the scoring table, which outlines one or more contributions within friction, and one or more contributions within inertia, to determine the remediation metric. For example, contributions within friction may include any of a complexity of a procedure, a parameter count, or a number of replacement options for a hardware and/or software item. These contributions within friction can be used to determine a maximum friction. Contributions within inertia may include any of a number of management user accounts on a device, a number of active user sessions and tunnel endpoints, an overall volume of traffic within a given timeframe, one or more characteristics of physical and/or logical interfaces, a number of enabled features on the device, a number of inventory-type details per node, or a configuration size. For each of the contributions within friction, a relative factor-weight is defined, where a total weight of the factors may total 100. Likewise, for each of the contributions within inertia, a relative factor weight is defined, where a total weight of the factors may total 100. For each of the nodes, including Node A and Node B, a value, a score, and a weighted contribution are determined. The score can be based on a maximum of 100. The weighted contributions for Node A and Node B can be used to determine the remediation metric.

Figure 8:
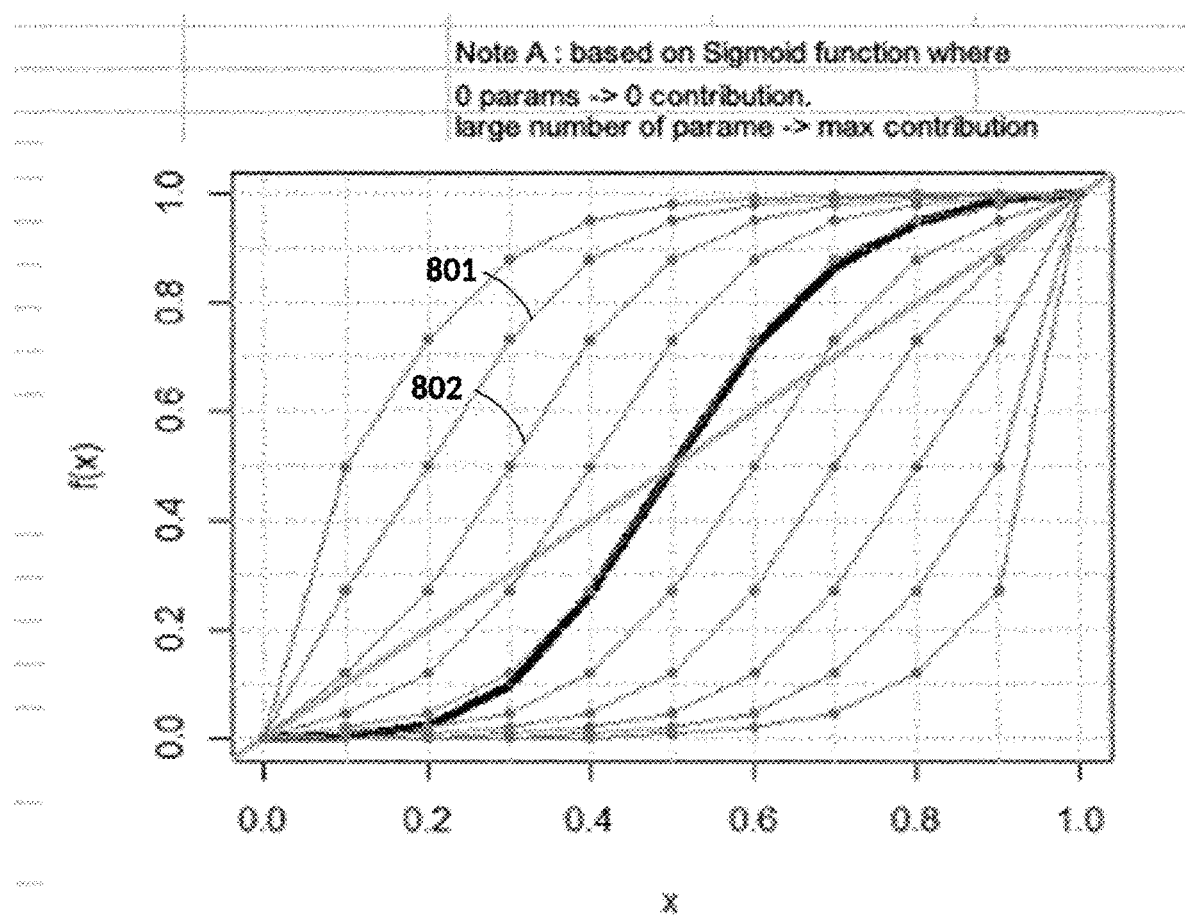
FIG. 8 illustrates an example of a sigmoid function for scaling one or more network entity parameters, in accordance with one or more aspects of the present disclosure.

FIG. 8 illustrates an example of a sigmoid function for scaling one or more network entity parameters, in accordance with one or more aspects of the present disclosure. For instance, one or more parameters for Node A and/or Node B can be scaled to provide one or more metrics that fall approximately within the range of 0 to 100.

FIG. 9 illustrates an example of weighing contributions within friction and contributions within inertia that a computing system (e.g., remediation system 239 of trust controller 104) may use to prepare the scoring table of FIG. 7, in accordance with one or more aspects of the present disclosure. P-nodes, such as Node A, may have different characteristics compared to PE-nodes, such as Node B. Whereas P-nodes may occasionally terminate tunnels, PE-nodes may interface with customers and typically feature many tunnel termination points. By contrast, traffic volume can be much higher in the case of P-nodes compared to PE-nodes. Differences may also exist with respect to a quantity or number of physical and logical interfaces. P-nodes usually feature few high-bandwidth interfaces, while PE-nodes may provide fan-out access to devices and customers, featuring many more interfaces and interface types. Accordingly, the number of features enabled on PE-nodes can be much higher than in the case of P-nodes, which may also be reflected in the configuration size. A parameter count 902 can be scaled using a curve 802 on the sigmoid function of FIG. 8. Likewise, a set of replacement options 901 (FIG. 9) can be scaled using a curve 801 on the sigmoid function of FIG. 8.

To present a simplified example for comparing P-nodes to PE-nodes, one may assume that replacing an end-of-life hardware and/or software item would increase the Trust metric of every item by 20% (termed "Trust Opportunity")

TABLE 3

| Entity | Trust Metric | Remediation Metric | Trust Opportunity |
|---|---|---|---|
| Node-A | 75 | 17 | +20 |
| Node-B | 40 | 50 | +20 |

With reference to Table 3, looking solely at the Trust Metric, remediating Node B can be considered a priority as both nodes have same Trust Opportunity, i.e., potential increase in Trust Metric. However, the Remediation Metric can be used in conjunction with the Trust Metric to decide how to proceed:

Trust Opportunity per Remediation Metric =

(Trust Opportunity)/(Remediation Metric)

In some cases, it may be more beneficial to perform upgrades or changes starting with items having a lower inertia metric (e.g., Node A), before performing upgrades or changes to items having a higher inertia metric (e.g., Node-B).

In some examples, the remediation metric can be used when replacing optical modules: A given change may have the same Trust Opportunity across a plurality of modules. One module instance may be impacted more by physical access, prior planning requirements or impact if services are interrupted. This consideration can be gauged via a higher Remediation Metric for a harder-to-access module. Likewise, for switch (SW) upgrades: The same change may have the same Trust Opportunity. However, changes that can be performed remotely at convenient timeslots and that do not require local access may have a lower Remediation Metric. Nodes with a high inertia metric, e.g., the node needs on-site attendance, will tend to have a higher remediation metric wherein risks may need to be mitigated.

In some examples, the present solution can be applied to remediation work, i.e., changes, allowing an algorithmic evaluation and quantitative analysis. The solution may be modified by adding one or more new factors, and/or by removing one or more factors defined herein. New factors may incorporate manual evaluations to broaden the criteria without the need for a complete manual analysis. In some examples, one may adjust or tune the relative weight of the inertia metric vs. the friction metric. This adjustment may depend on the situation and historical data. To begin with, an operator may decide that an application of multiple fixes has more impact than the additional complexity posed by multiple nodes (hence the 60:40 ratio).

The remediation metric can be used to identify a best or optimum way to approach remediation actions in a network. The remediation metric can provide the operator with information as to whether change-focused vs node-focused updates result in a lower overall remediation metric, thereby allowing operators to plan and optimize workflows. As an example, by generating the trust metric, the operator understands that four issues exist in the network. By remediating them, each entity's trust metric can increase. This potential improvement can be considered a "trust opportunity".

FIGS. 10A-10C illustrate examples of determining the remediation metric, in accordance with one or more aspects of the present disclosure. The calculations illustrated in the examples may be performed by a computing system or network controller (e.g., by remediation system 239 of network controller 104). FIG. 10A shows an example of how such a computing system may determine the remediation metric wherein each remediation action is treated as an isolated work item. FIG. 10B shows an example of determining the remediation metric where a plurality of issues on a network entity are addressed by grouping activities together. FIG. 10C shows an example of determining the remediation metric by grouping together a plurality of nodes across a network where the nodes have similar issues. FIGS. 10A, 10B and 10C illustrate the friction metric, the inertia metric, and the remediation metric. A parameter called "Trust per" ("Remediation Metric" per change) can be calculated as a percentage. In these examples, two type of actions i.e., required remediations, can be identified (each with its own friction metric). These actions can be applied to three different entities (each entity having its own inertia metric). Note that one entity (Node-3) may need both remediations.

FIG. 10A shows an example of the remediation metric if each remediation is treated as an isolated and distinct piece of work. For example, for change #1 as a standalone item:

Trust Opportunity = 6%

Remediation Metric = 70 × 60% + 90 × 40% = 78%

Trust Opportunity per Remediation Metric = 6 ÷ 78% = 7.7%

FIG. 10B shows an example of the remediation metric if both issues on node 3 are fixed in one shot by grouping activities for Node-3:

Trust Opportunity = 5% + 8% = 13%

Remediation Metric = (50 + 70) × 60% + 50 × 40% = 92%

Trust Opportunity per Remediation Metric = 13 ÷ 92% = 14.1%

FIG. 10C shows an example of the remediation metric if similar issues are grouped together and fixed across the network irrespective of nodes. For an SKU-44 upgrade on all relevant entities (Node2 and Node-3) as a grouped activity:

Trust Opportunity = 6% + 8% = 14%

Remediation Metric = 70 × 60% + (90 + 50) × 40% = 92%

Trust Opportunity per Remediation Metric = 14 ÷ 92% = 15.2%

The above metrics suggest that for this exemplary network, applying changes grouped by type of change may create a lower remediation metric versus applying changes grouped by node (i.e., all fixes on a node as a group). This result ensues because, in the present example, the friction metric is more significant than the inertia metric. Thus, grouping remedy actions provides advantages compared to non-grouped actions. In other examples where inertia is more significant, it may be preferable to apply changes one node at a time. These grouping calculations assume that, where a remediation action is grouped by node, inertia needs counted once per node; and where the remediation action is grouped by change type, friction can be counted once per type of change—these are both simplifications to facilitate a determination of the remediation metric. Grouping evaluations can be a useful input for workforce planning.

In Software Engineering, a notion of "technical debt" exists. Technical debt (also known as design debt or code debt) is the implied cost of additional rework caused by choosing an easy (limited) solution now instead of using a better approach that would take longer. Analogous with monetary debt, if technical debt is not repaid, it can accumulate "interest", making it harder to implement changes. Unaddressed technical debt increases software entropy and cost of further rework. In some examples, software technical debt may be regarded as analogous to trust opportunity. The procedures for calculating inertia (factors that may relate to a software code module, making it difficult to change) and friction (factors relating to the type of software code change) both apply. Combining factors based on the inertia metric and the friction metric to generate the remediation metric may be performed. These metrics can be used to supplement existing technical debt applications and calculations. Also, the grouping calculation may apply to help plan work e.g., to minimize the remediation metric, to select work giving the best technical debt increase per the remediation metric.

Figure 11:
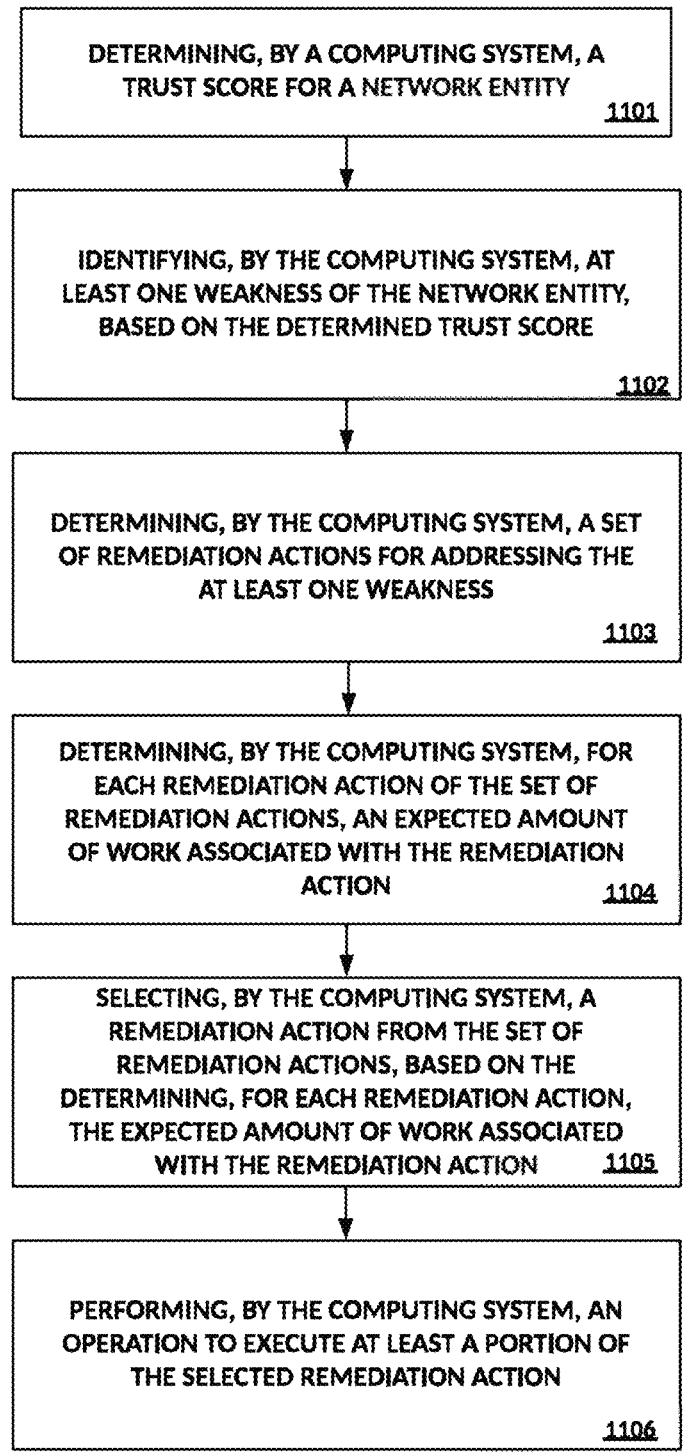
FIG. 11 is a flow diagram illustrating operations performed by an example trust controller in accordance with one or more aspects of the present disclosure.

FIG. 11 is a flow diagram illustrating operations performed by an example trust controller in accordance with one or more aspects of the present disclosure. FIG. 11 is described below within the context of network 100 and trust controller 104 of FIG. 1A. In other examples, operations described in FIG. 11 may be performed by one or more other components, modules, systems, or devices. Further, in other examples, operations described in connection with FIG. 11 may be merged, performed in a difference sequence, omitted, or may encompass additional operations not specifically illustrated or described.

In the process illustrated in FIG. 11, and in accordance with one or more aspects of the present disclosure, scoring system 222 (FIG. 2) of trust controller 104 may determine a trust score for a network entity 1101 (FIG. 11). Remediation system 239 of trust controller 104 may identify at least one weakness of the network entity, based on the determined trust score 1102. The remediation system 239 may determine a set of remediation actions for addressing the at least one weakness 1103; determine, for each remediation action of the set of remediation actions, an expected amount of work associated with the remediation action 1104; and select a remediation action from the set of remediation actions, based on the determining, for each remediation action, the expected amount of work associated with the remediation action 1105. Processor(s) 202, communication unit(s) 204, display screen 212, and/or output device(s) 210, may perform an operation associated with at least a portion of the selected remediation action 1106. For example, the operation may include the output device(s) 210 and/or the processor(s) 202 providing a remediation instruction to the computer network 100 (FIG. 1A), the display screen 212 (FIG. 2) displaying a remediation instruction, and/or the communication unit(s) 204 communicating a remediation instruction over the computer network 100.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are each hereby incorporated by reference in their entireties. To the extent that any such disclosure material that is incorporated by reference conflicts with the instant disclosure, the instant disclosure shall control.

For ease of illustration, only a limited number of devices (e.g., network entities 102, trust controller 104, entities 110, quantitative entities 160, qualitative entities 170, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in several different ways. For instance, one or more devices illustrated in the Figures herein (e.g., FIG. 1A and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   determining, by a computing system, a trust score for a network entity reflecting an assessment of trustworthiness for the network entity;
   identifying, by the computing system, at least one weakness of the network entity that affects the determined trust score;
   determining, by the computing system, a set of remediation actions for addressing the at least one weakness;
   determining, by the computing system, for each remediation action of the set of remediation actions, an expected amount of work associated with the remediation action, wherein the expected amount of work is based on a friction metric related to the remediation action and an inertia metric related to the network entity;
   selecting, by the computing system, a remediation action from the set of remediation actions, based on the determining, for each remediation action, the expected amount of work associated with the remediation action; and
   performing, by the computing system, an operation associated with at least a portion of the selected remediation action.

2. The method of claim 1, wherein the trust score is based on at least one of: a set of characteristics for the network entity, or a set of historical events associated with behavior of the network entity over time.

3. The method of claim 1, wherein the friction metric is based on at least one of a configuration change or a replacement of the network entity and wherein the inertia metric is based on dependencies of other network devices on the network entity.

4. The method of claim 3 further comprising determining, by the computing system, the friction metric by extracting one or more parameters from an extensible configuration checklist description format (XCCDF) document, wherein the one or more parameters comprise any of a sentiment analysis or a polarity score.

5. The method of claim 3, further comprising:
determining, by the computing system, the friction metric, in response to the network entity reaching an end-of-life condition;
determining, by the computing system, whether or not a replacement is available for the network entity; and
in response to the replacement not existing, increasing, by the computer system, the friction metric.

6. The method of claim 5, further comprising:
determining, by the computing system, whether the replacement of the network entity involves a hardware change; and
in response to the determining that the replacement of the network entity requires a hardware change, increasing, by the computer system, the friction metric.

7. The method of claim 3, further comprising determining, by the computing system, the inertia metric based on one or more of:
a number of management user accounts on the network entity;
a number of active user sessions dependent on the network entity;
a number of tunnel endpoints dependent on the network entity;
an overall volume of traffic on the network entity within a determined timeframe;
a characteristic of a physical interface for the network entity;
a characteristic of a logical interface for the network entity;
a number of enabled features for the network entity;
a number of inventory-type details per node for the network entity; or
a size of a configuration file for the network entity.

8. The method of claim 3, further comprising determining, by the computing system, a relative weight between the friction metric and the inertia metric for the set of remediation actions.

9. The method of claim 8, wherein the relative weight between the friction metric and the inertia metric is approximately 60:40.

10. The method of claim 3, wherein selecting the remediation action further comprises determining one or more of the friction metric or the inertial metric by applying a sigmoid function to one or more parameters of the network entity.

11. The method of claim 3, wherein the selected remediation action comprises changing a configuration of at least one of:
a router, a firewall, an access control system, an asset management system, or an alarm system.

12. The method of claim 3, wherein the selected remediation action comprises at least one of:
changing a routing algorithm, limiting access to one or more network entities, marking one or more network entities as unavailable, or triggering an alarm.

13. A system comprising processing circuitry and a storage device, wherein the processing circuitry has access to the storage device and is configured to:
determine a trust score for a network entity reflecting an assessment of trustworthiness for the network entity;
identify at least one weakness of the network entity that affects the determined trust score;
determine a set of remediation actions for addressing the at least one weakness;
determine, for each remediation action of the set of remediation actions, an expected amount of work associated with the remediation action, wherein the expected amount of work is based on a friction metric related to the remediation action and an inertia metric related to the network entity;
select a remediation action from the set of remediation actions, based on the determining, for each remediation action, the expected amount of work associated with the remediation action; and
perform an operation associated with at least a portion of the selected remediation action.

14. The system of claim 13, wherein the trust score is based on at least one of: a set of characteristics for the network entity, or a set of historical events associated with behavior of the network entity over time.

15. The system of claim 13, wherein the friction metric is based on at least one of a configuration change or a replacement of the network entity and wherein the inertia metric is based on dependencies of other network devices on the network entity.

16. The system of claim 15, wherein the processing circuitry is further configured to extract one or more parameters from an extensible configuration checklist description format (XCCDF) document to determine the friction metric.

17. The system of claim 15, wherein the processing circuitry is further configured to determine the inertia metric based on one or more of: a number of management user accounts on the network entity; a number of active user sessions dependent on the network entity; a number of tunnel endpoints dependent on the network entity; an overall volume of traffic on the network entity within a determined timeframe; a characteristic of a physical interface for the network entity; a characteristic of a logical interface for the network entity; a number of enabled features for the network entity; a number of inventory-type details per node for the network entity; or a size of a configuration file for the network entity.

18. The system of claim 15, wherein the processing circuitry is further configured to determine a relative weight between the friction metric and the inertia metric for the set of remediation actions.

19. The system of claim 18, wherein the relative weight between the friction metric and the inertia metric is approximately 60:40.

20. Non-transitory computer-readable media storing instructions thereon, when the instructions are executed, configure processing circuitry of a computing system to:
determine a trust score for a network entity reflecting an assessment of trustworthiness for the network entity;
identify at least one weakness of the network entity that affects, based on the determined trust score;
determine a set of remediation actions for addressing the at least one weakness;
determine, for each remediation action of the set of remediation actions, an expected amount of work associated with the remediation action, wherein the expected amount of work is based on a friction metric related to the remediation action and an inertia metric related to the network entity;
select a remediation action from the set of remediation actions, based on the determining, for each remediation action, the expected amount of work associated with the remediation action; and
perform an operation associated with at least a portion of the selected remediation action.

* * * * *